US009026794B2

(12) United States Patent
Ueda et al.

(10) Patent No.: US 9,026,794 B2
(45) Date of Patent: *May 5, 2015

(54) INFORMATION PROCESSING DEVICE AND INFORMATION PROCESSING METHOD, AND PROGRAM

(75) Inventors: Kenjiro Ueda, Kanagawa (JP); Hiroshi Kuno, Kanagawa (JP); Takamichi Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 13/546,412

(22) Filed: Jul. 11, 2012

(65) Prior Publication Data

US 2013/0042114 A1    Feb. 14, 2013

(30) Foreign Application Priority Data

Aug. 11, 2011 (JP) ................................. 2011-175606

(51) Int. Cl.
*G06F 21/00* (2013.01)
*G11B 20/00* (2006.01)
(Continued)

(52) U.S. Cl.
CPC .......... *G11B 20/00427* (2013.01); *G06F 21/10* (2013.01); *G06F 21/445* (2013.01); *G11B 20/00195* (2013.01); *G11B 20/00253* (2013.01); *G11B 20/00818* (2013.01); *H04L 9/088* (2013.01); *H04L 9/0897* (2013.01); *H04L 9/3242* (2013.01); *H04L 9/3263* (2013.01); *H04L 2209/60* (2013.01); *H04L 63/0428* (2013.01); *H04L 63/0869* (2013.01); *H04L 63/10* (2013.01); *H04L 2463/101* (2013.01);

(Continued)

(58) Field of Classification Search
CPC . H04L 63/0823; H04L 63/0869; H04L 63/10; H04L 9/3263
USPC ................. 713/189, 193, 156–158, 168, 173, 713/175–176; 726/27
See application file for complete search history.

(56) References Cited

U.S. PATENT DOCUMENTS 8,082,212 B2 * 12/2011 Okamoto ......................... 705/58
8,332,657 B1 * 12/2012 Eskicioglu et al. ........... 713/193
(Continued)

OTHER PUBLICATIONS

Ahmet M. Eskicioglu et al., An overview of multimedia content protection in consumer electronics devices, Apr. 2001, Science Direct, vol. 16, Issue 7, pp. 1-19.*

(Continued)

*Primary Examiner* — Christopher Brown
*Assistant Examiner* — Fahimeh Mohammadi
(74) *Attorney, Agent, or Firm* — Sony Corporation

(57) ABSTRACT

An information processing system including a medium where a content to be played is stored; and a playing apparatus for playing a content stored in the medium; with the playing apparatus being configured to selectively activate a playing program according to a content type to be played, to obtain a device certificate correlated with the playing program from storage by executing the playing program, and to transmit the obtained device certificate to the medium; with the device certificate being a device certificate for content types in which content type information where the device certificate is available is recorded; and with the medium determining whether or not an encryption key with reading being requested from the playing apparatus is an encryption key for decrypting an encrypted content matching an available content type recorded in the device certificate, and permitting readout of the encryption key only in the case of matching.

20 Claims, 23 Drawing Sheets

(51) Int. Cl.
*G06F 21/10* (2013.01)
*G06F 21/44* (2013.01)
*H04L 9/08* (2006.01)
*H04L 9/32* (2006.01)
*H04L 29/06* (2006.01)

(52) U.S. Cl.
CPC ... *H04L 2463/103* (2013.01); *G06F 2221/0704* (2013.01); *G06F 2221/2129* (2013.01); *G06F 2221/2107* (2013.01)

(56) References Cited

U.S. PATENT DOCUMENTS

| | | | | |
|---|---|---|---|---|
| 2005/0268346 | A1* | 12/2005 | Lee et al. | 726/27 |
| 2007/0300078 | A1* | 12/2007 | Ochi et al. | 713/189 |
| 2008/0022395 | A1* | 1/2008 | Holtzman et al. | 726/19 |
| 2009/0024849 | A1* | 1/2009 | Nakano et al. | 713/175 |
| 2010/0031366 | A1* | 2/2010 | Knight et al. | 726/26 |
| 2010/0138652 | A1* | 6/2010 | Sela et al. | 713/158 |
| 2010/0275036 | A1* | 10/2010 | Harada et al. | 713/189 |
| 2011/0191600 | A1* | 8/2011 | Sabet-Sharghi et al. | 713/193 |

OTHER PUBLICATIONS

Willem Jonker et al., Digital Rights Mangement in Consumer Electronic Prodicts, Mar. 2004, IEEE, vol. 21, Issue 2, pp. 82-91.*
Qiong Liu et al., Digital Rights Management for Content Distribution, 2003, ACM, vol. 21, pp. 49-58.*
Tatsuya Hirai et al., Overview of Content Protection Technology for Intelligent Attached Devices, Jan. 7-11, 2006, IEEE, pp. 107-108.*
U.S. Appl. No. 13/547,690, filed Jul. 12, 2012, Ueda, et al.
U.S. Appl. No. 13/547,466, filed Jul. 12, 2012, Ueda, et al.

* cited by examiner

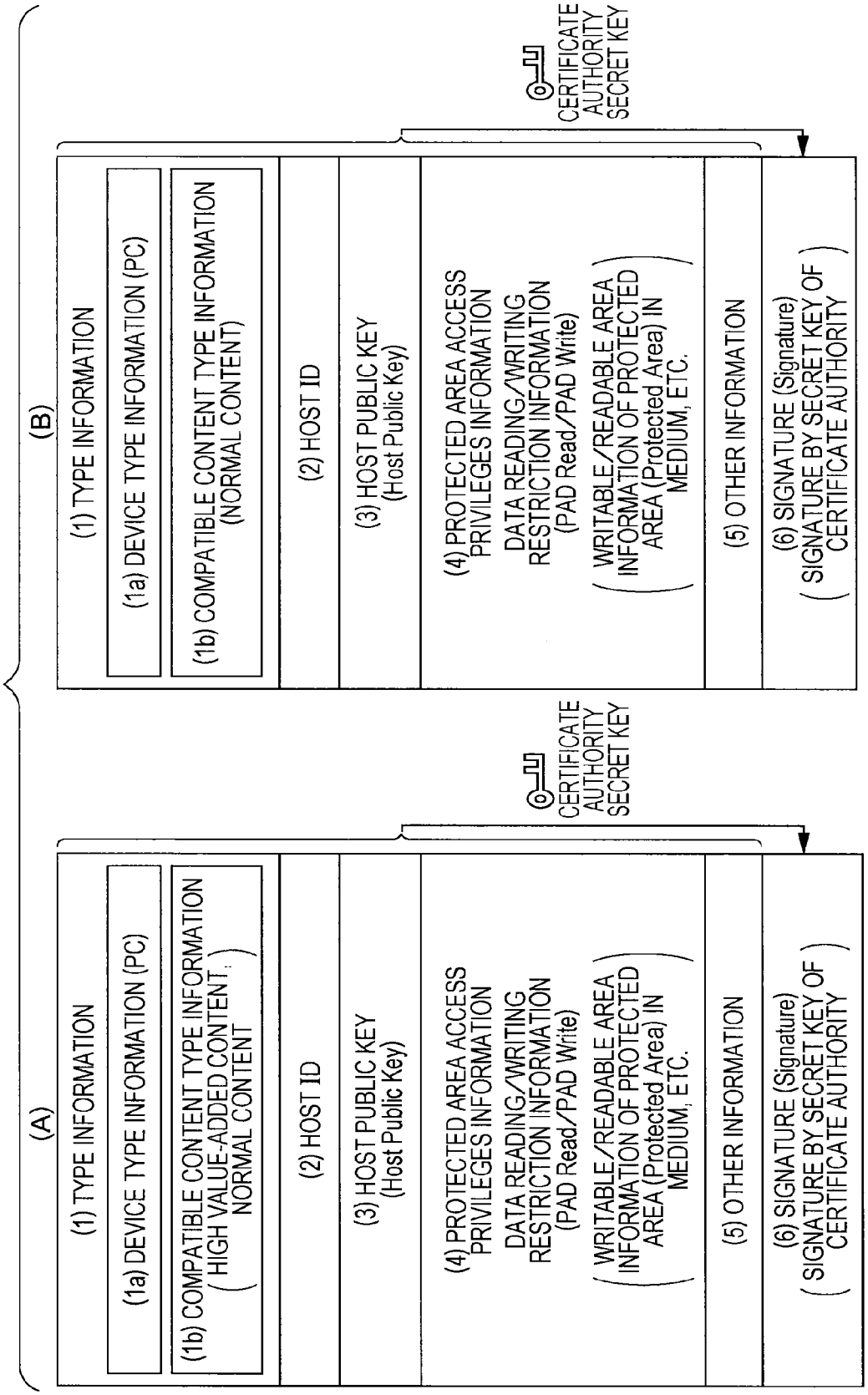

FIG. 8

| (1a) DEVICE TYPE INFORMATION (PC) | (1b) COMPATIBLE CONTENT TYPE INFORMATION (HIGH VALUE-ADDED CONTENT, NORMAL CONTENT) | |
|---|---|---|
| 0x0001 (DEVICE ONLY FOR RECORDING/PLAYING) | 0x0001 | CORRESPONDING TO NORMAL CONTENTS ALONE |
| | 0x0002 | CORRESPONDING TO HIGH VALUE-ADDED CONTENTS ALONE |
| | 0x0003 | CORRESPONDING TO BOTH OF HIGH VALUE-ADDED CONTENTS AND NORMAL CONTENTS |
| 0x0002 PC/PORTABLE TERMINAL | 0x0001 | CORRESPONDING TO NORMAL CONTENTS ALONE |
| | 0x0002 | CORRESPONDING TO HIGH VALUE-ADDED CONTENTS ALONE |
| | 0x0003 | CORRESPONDING TO BOTH OF HIGH VALUE-ADDED CONTENTS AND NORMAL CONTENTS |

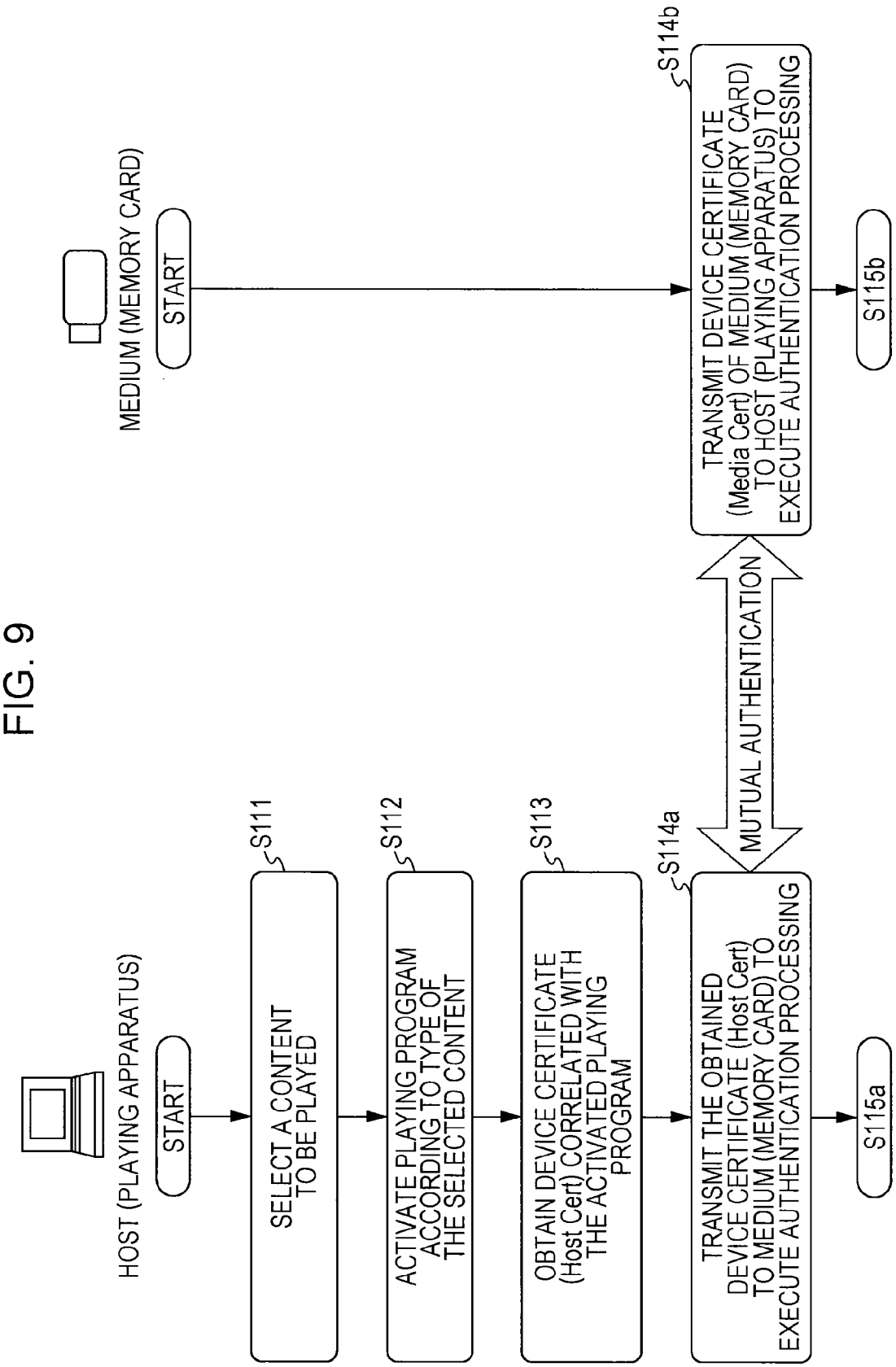

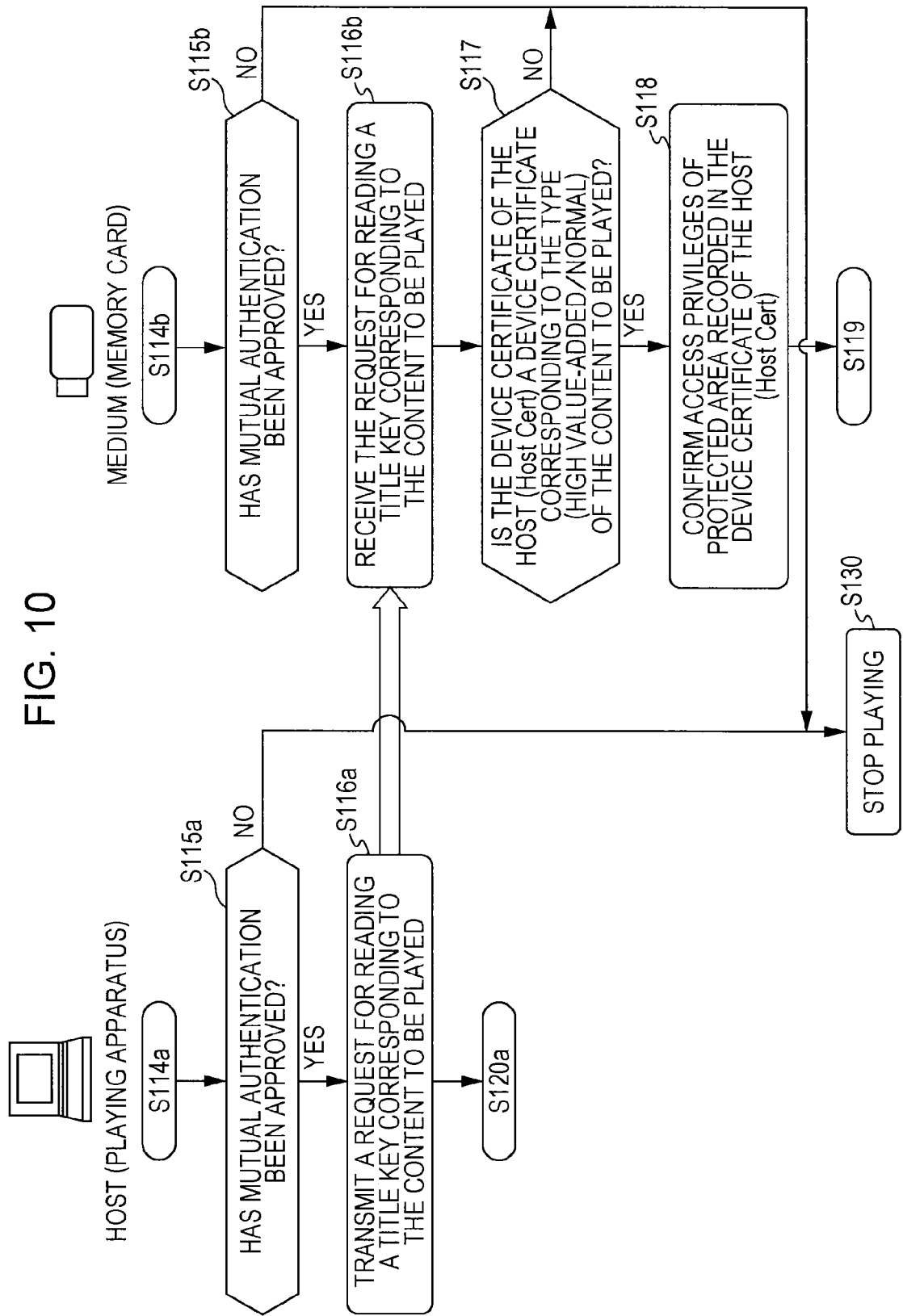

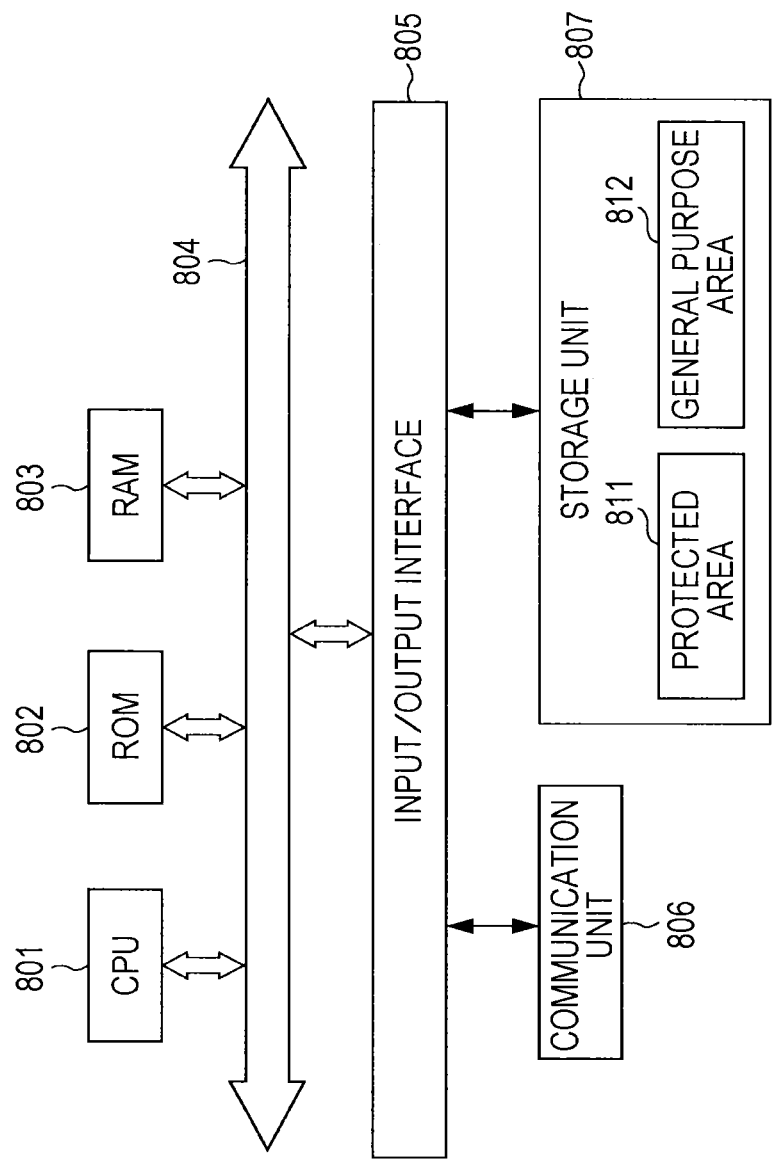

INFORMATION PROCESSING DEVICE AND INFORMATION PROCESSING METHOD, AND PROGRAM

BACKGROUND

The present disclosure relates to an information processing device and an information processing method, and a program, and specifically relates to an information processing device and an information processing method, and a program, which effectively restrain unauthorized usage of contents recorded in a recording medium, for example, such as a memory card or the like.

Recently, various media such as DVD (Digital Versatile Disc), Blu-ray Disc (registered trademark), flash memory, and so forth have been used as information recording media. In particular, recently, usage of memory cards such as USB memory having a large capacity of flash memory has become popular. A user can perform playing of contents by recording a content such as music, movies, and so forth in such various information recording media and mounting these on a playing apparatus (player).

However, with many contents such as music data, image data, and so forth, copyright and distribution rights and so forth are possessed by an author or seller thereof. Accordingly, in the case of providing a content to users, it is common to provide a certain usage restriction, i.e., to perform control so as to permit only a user who has a legitimate use right to use the content, and so as to restrain unregulated use such as copying without permission, and so forth.

For example, AACS (Advanced Access Content System) has been used as a standard relating to usage control of contents. The standard of the AACS defines usage control configuration as to a recorded content of Blu-ray Disc (registered trademark), for example. Specifically, for example, the standard of the AACS stipulates an algorithm for taking a content to be recorded in Blu-ray Disc (registered trademark) as an encrypted content, and enabling users who can obtain the encryption key thereof to be restricted to regular users, and for forth.

However, with the current AACS stipulations, though there is a stipulation regarding usage control configuration as to a disc recorded content such as Blu-ray Disc (registered trademark) or the like, there is no sufficient stipulation regarding a content to be recorded in flash memory, for example, such as a memory card or the like. Accordingly, protection of a copyright may be insufficient regarding a recorded content in such a memory card, and accordingly, it has been requested to build a usage control configuration regarding content usage using a medium such as a memory card or the like.

For example, with the AACS stipulations, there are the following stipulations as a usage control configuration as to a disc-recorded content such as Blu-ray Disc (registered trademark) or the like.
(a) Usage stipulations as to a content copied to a disc such as Blu-ray Disc (registered trademark) from a medium (e.g., ROM disc) in which a content has already been recorded
(b) Usage stipulations as to a content downloaded from a server and recorded in a disc such as Blu-ray Disc (registered trademark)

For example, usage control of such contents is stipulated.

With the AACS, for example, in the case of executing copying of a content between media in the above (a), managed copying (MC: Managed Copy) with obtaining copy permission information from a management server as a condition is stipulated.

Also, as download processing of a content from a server in the above (b), with the AACS, various types of download modes are stipulated, such as EST (Electric Sell Through) using a user device such as a PC or the like, MoD (Manufacturing on Demand) using a shared terminal installed in a convenience store or the like, and in the case of recording a content in a disc by each download processing of these and using this as well, it is necessary to perform processing in accordance with a predetermined rule. Note that these processes are described in Japanese Unexamined Patent Application Publication No. 2008-98765, for example.

However, as described above, with the AACS stipulations, there is a problem in that the stipulations assume performing usage control of disc-recorded content such as with Blu-ray Disc (registered trademark) or the like, and there is no specification relating to sufficient usage control regarding content recorded in memory cards such as a flash memory types including USB memory and so forth.

SUMMARY

It has been found to be desirable to provide an information processing device, an information processing method, and a program, which establish usage control configuration in the case of recording a content in an information recording medium such as flash memory or the like and using this to restrain unauthorized use of contents.

According to an embodiment of the present disclosure, an information processing system includes: a medium in which a content serving as an object to be played is stored; and a playing apparatus configured to play a content stored in the medium; with the playing apparatus being configured to selectively activate a playing program according to a content type selected as an object to be played, to obtain a device certificate correlated with the playing program from a storage unit by execution of the selectively activated playing program, and to transmit the obtained device certificate to the medium; with the device certificate being a content-type corresponding device certificate in which content type information that can take advantage of the device certificate is recorded; and with the medium determining whether or not an encryption key of which a reading request has been performed from the playing apparatus is an encryption key for decrypting an encrypted content matching an available content type recorded in the device certificate, and permitting readout of the encryption key only in the case of matching.

Further, with an embodiment of the information processing system of the present disclosure, the device certificate has a structure where at least one of a high value-added content and a normal content other than the high value-added content is recorded as a content type that can take advantage of the device certificate; with the medium determining whether or not an encryption key of which reading from the playing apparatus has been requested is an encryption key for decrypting an encrypted content matching a high value-added content or normal content which is an available content type recorded in the device certificate, and permitting readout of the encryption key only in the case of matching.

Further, with an embodiment of the information processing system of the present disclosure, the playing apparatus transmits an obtained device certificate to the media to execute authentication processing; with the medium executing permission determination processing of an encryption key readout request from the playing apparatus with establishment of the authentication processing as a condition.

Further, with an embodiment of the information processing system of the present disclosure, the playing apparatus selectively activates a playing program by identifying the type of a selected content in accordance with attribute information correlated with a content selected as an object to be played.

Further, with an embodiment of the information processing system of the present disclosure, the medium stores an encryption key in a protected area where access is permitted based on confirmation of access privileges of a playing apparatus, and confirms access privileges of the protected area where the encryption key is stored, based on protected area access privileges information recorded in a device certificate to be received from the playing apparatus, and permits readout of an encryption key by the playing apparatus in the case of the access privileges of the playing apparatus being confirmed.

Further, with an embodiment of the information processing system of the present disclosure, the device certificate has a structure where playing apparatus type information that can take advantage of the device certificate is recorded; with the medium executing encoding processing of a medium ID that is identification information of the medium in accordance with an encoding algorithm to be selected according to playing apparatus type information recorded in the device certificate to transmit to the playing apparatus; and with the playing apparatus performing decoding or playing of a content accompanying with data processing to which a medium ID obtained by decoding an encoded medium ID received from the medium in accordance with a decoding algorithm corresponding to the device type of the apparatus itself has been applied.

According to an embodiment the present disclosure, an information processing device includes: a data processing unit configured to execute readout and playback processing of a content stored in a medium; with the data processing unit being configured to selectively activate a playing program according to a content type selected as an object to be played, to obtain a device certificate correlated with this playing program from a storage unit by execution of the selectively activated playing program to transmit the obtained device certificate to the medium, and also to output an encrypted content, and a readout request of an encryption key to be applied to decryption of this encrypted content to the medium, and to obtain an encryption key from the medium with confirmation being made with the medium as a condition wherein an encryption key of which the readout request has been performed is an encryption key of a content matching a content type that can be used recorded in the device certificate to perform decryption of an encrypted content by applying the obtained encryption key thereto.

Further, with an embodiment of the information processing device of the present disclosure, the device certificate has a structure where at least one of a high value-added content and a normal content other than the high value-added content is recorded as a content type that can take advantage of the device certificate.

Further, with an embodiment of the information processing device of the present disclosure, the data processing unit transmits an obtained device certificate to the medium to execute authentication processing.

Further, with an embodiment of the information processing device of the present disclosure, the data processing unit selectively activates a playing program by identifying the type of a selected content in accordance with attribute information correlated with a content selected as an object to be played.

Further, with an embodiment of the information processing device of the present disclosure, the device certificate has a structure where playing apparatus type information that can take advantage of the device certificate is recorded; with the medium executing encoding processing of a medium ID that is identification information of the medium in accordance with an encoding algorithm to be selected according to playing apparatus type information recorded in the device certificate to transmit to the information processing device; and with a data processing unit of the information processing device performing decoding or playing of a content accompanying with data processing to which a medium ID obtained by decoding an encoded medium ID received from the medium in accordance with a decoding algorithm corresponding to the device type of the apparatus itself has been applied.

According to an embodiment of the present disclosure, an information processing device includes: a storage unit in which an encrypted content serving as an object to be played in a playing apparatus, and an encryption key to be applied to decryption of the encrypted content are stored; and a data processing unit; with the data processing unit being configured to receive a device certificate from the playing apparatus, and also to receive a readout request of an encryption key to be applied to decryption of an encrypted content serving as an object to be played, and to determine whether or not an encryption key of which a reading request has been performed from the playing apparatus is an encryption key for decrypting an encrypted content matching an available content type recorded in the device certificate, and to permit readout of the encryption key only in the case of matching.

Further, with an embodiment of the information processing device of the present disclosure, the device certificate has a structure where at least one of a high value-added content and a normal content other than the high value-added content is recorded as a content type that can take advantage of the device certificate; with the data processing unit determining whether or not an encryption key of which a reading request has been performed from the playing apparatus is an encryption key for decrypting an encrypted content matching a high value-added content or normal content which has an available content type recorded in the device certificate, and permitting readout of the encryption key only in the case of matching.

Further, with an embodiment of the information processing device of the present disclosure, the encryption key is stored in a protected area within a storage unit where access is permitted based on confirmation of access privileges of a playing apparatus; with the data processing unit confirming access privileges of the protected area where the encryption key is stored, based on protected area access privileges information recorded in a device certificate to be received from the playing apparatus, and permitting readout of an encryption key by the playing apparatus in the case of the access privileges of the playing apparatus being confirmed.

Further, with an embodiment of the information processing device of the present disclosure, the device certificate has a structure where playing apparatus type information that can take advantage of the device certificate is recorded; with the data processing unit executing encoding processing of a medium ID that is identification information of the medium in accordance with an encoding algorithm to be selected according to playing apparatus type information recorded in the device certificate to transmit to the playing apparatus.

An embodiment of the present disclosure is an information processing method to be executed in an information processing system having a medium in which a content serving as an object to be played is stored, and a playing apparatus configured to play a content stored in the medium, with the playing apparatus being configured to selectively activate a playing program according to a content type selected as an object to be played, and to obtain a device certificate correlated with this playing program from a storage unit by execution of the selectively activated playing program to transmit the obtained device certificate to the medium; with the device certificate being a device certificate in which content type information that can take advantage of the device certificate is recorded; and with the medium determining whether or not an encryption key of which a reading request has been performed from the playing apparatus is an encryption key for decrypting an encrypted content matching an available content type recorded in the device certificate, and permitting readout of the encryption key only in the case of matching.

An embodiment of the present disclosure is an information processing method to be executed in an information processing device, with a data processing unit being configured to selectively activate a playing program according to a content type selected as an object to be played, and to obtain a device certificate correlated with this playing program from a storage unit by execution of the selectively activated playing program to transmit the obtained device certificate to the medium, and also to output an encrypted content, and a readout request of an encryption key to be applied to decryption of this encrypted content to the medium, and to obtain an encryption key from the medium with confirmation being made with the medium as a condition wherein an encryption key of which the readout request has been performed is an encryption key of a content matching a content type that can be used recorded in the device certificate to perform decryption of an encrypted content by applying the obtained encryption key thereto.

An embodiment of the present disclosure is an information processing method to be executed in an information processing device, with the information processing device including: a storage unit in which an encrypted content serving as an object to be played in a playing apparatus, and an encryption key to be applied to decryption of the encrypted content are stored; and a data processing unit; with the data processing unit being configured to receive a device certificate from the playing apparatus, and also to receive a readout request of an encryption key to be applied to decryption of an encrypted content serving as an object to be played, and to determine whether or not an encryption key of which a reading request has been performed from the playing apparatus is an encryption key for decrypting an encrypted content matching an available content type recorded in the device certificate, and to permit readout of the encryption key only in the case of matching.

An embodiment of the present disclosure is a program causing an information processing device to execute information processing, and causing a data processing unit to selectively activate a playing program according to a content type selected as an object to be played, to obtain a device certificate correlated with this playing program from a storage unit by execution of the selectively activated playing program to transmit the obtained device certificate to the medium, and also to output an encrypted content, and a readout request of an encryption key to be applied to decryption of this encrypted content to the medium, and to obtain an encryption key from the medium with confirmation being made with the medium as a condition wherein an encryption key of which the readout request has been performed is an encryption key of a content matching a content type that can be used recorded in the device certificate to perform decryption of an encrypted content by applying the obtained encryption key thereto.

An embodiment of the present disclosure is a program causing an information processing device to execute information processing, with the information processing device including: a storage unit in which an encrypted content serving as an object to be played in a playing apparatus, and an encryption key to be applied to decryption of the encrypted content are stored; and a data processing unit; with the program causing the data processing unit to receive a device certificate from the playing apparatus, and also to receive a readout request of an encryption key to be applied to decryption of an encrypted content serving as an object to be played, and to determine whether or not an encryption key of which a reading request has been performed from the playing apparatus is an encryption key for decrypting an encrypted content matching an available content type recorded in the device certificate, and to permit readout of the encryption key only in the case of matching.

Note that the program according to the present disclosure is, for example, a program that can be provided with a storage medium or communication medium to be provided in a computer-readable format as to an information processing device or computer system which can execute various program codes. Such a program is provided in a computer-readable format, and accordingly, processing according to the program over the information processing device or computer system is realized.

Further objects, features, and advantages of the present disclosure will become apparent from later-described embodiments of the present disclosure and the attached drawings. Note that system as used in the present Specification is a logical group configuration of multiple devices, and is not restricted to each component device being within the same housing.

According to an embodiment of the present disclosure, a device and method for realizing content usage control according to the content type of a content stored in a medium are realized.

Specifically, a playing apparatus holds a device certificate corresponding to an available content type according to the type of a content, e.g., a content type such as a high value-added content such as a movie soon after being released to the public, and a normal content other than that. The playing apparatus activates a playing program according to the type of a content to be played at the time of authentication processing with the medium in which a content is stored, obtains a device certificate corresponding to the content type to be played correlated with the activated program, provides this to the medium, and executes authentication processing. The medium confirms corresponding content type information recorded in the device certificate, and only in the case that a title key requested by the playing apparatus is a title key corresponding to a content matching the corresponding content type recorded in the device certificate, permits readout of the title key.

According to these processes, title key readout control according to content type may be performed, and consequently, content usage control according to the content type is realized.

BRIEF DESCRIPTION OF THE DRAWINGS

FIG. 7 is a diagram for describing a data configuration example of the host certificate (Host Certificate) in which a device type and type information of the corresponding content type are recorded;

FIG. 8 is a diagram for describing a specific example of a device type, and the type information of the corresponding content type to be recorded in the host certificate (Host Certificate);

FIG. 9 is a diagram illustrating a flowchart for describing a content usage sequence to be executed by selectively activating a playing program according to content type and using the host certificate (Host Certificate) correlated with the activated playing program;

FIG. 10 is a diagram illustrating a flowchart for describing the content usage sequence to be executed by selectively activating a playing program according to content type and using the host certificate (Host Certificate) correlated with the activated playing program;

FIG. 23 is a diagram for describing a hardware configuration example of a memory card.

DETAILED DESCRIPTION OF EMBODIMENTS

Hereafter, description will be made regarding the details of an information processing device, and an information processing method, and a program according to the present disclosure, with reference to the drawings. Note that description will be made in accordance with the following items.
1. Overviews of Content Providing Processing and Usage Processing
2. Configuration Example and Usage Example of Memory Card
3. Certificate Having Access Permission Information as to Protected Area
4. Access Processing Example as to Memory Card to Which Each Device Certificate Has Been Applied
5. Processing Example between Host (Playing Apparatus) and Medium (Memory Card)
  5-1. (First Embodiment) Processing Example between Host and Medium Using Device Certificate according to Content Type
  5-2. (Second Embodiment) Processing Example for Selecting Device Certificate Applied by Playing Program
  5-3. (Third Embodiment) Processing Example for Changing Conversion Mode of Identifier (Medium ID) of Medium (Memory Card) according to Type of Playing Device
6. Hardware Configuration Example of Each Device
7. Overview of Configuration of Present Disclosure 1. Overviews of Content Providing Processing and Usage Processing Hereafter, description will be made regarding the details of an information processing device, and an information processing method, and a program according to the present disclosure, with reference to the drawings.

First, overviews of content providing processing and usage processing will be described with reference to FIG. 1 and thereafter.

Figure 1:
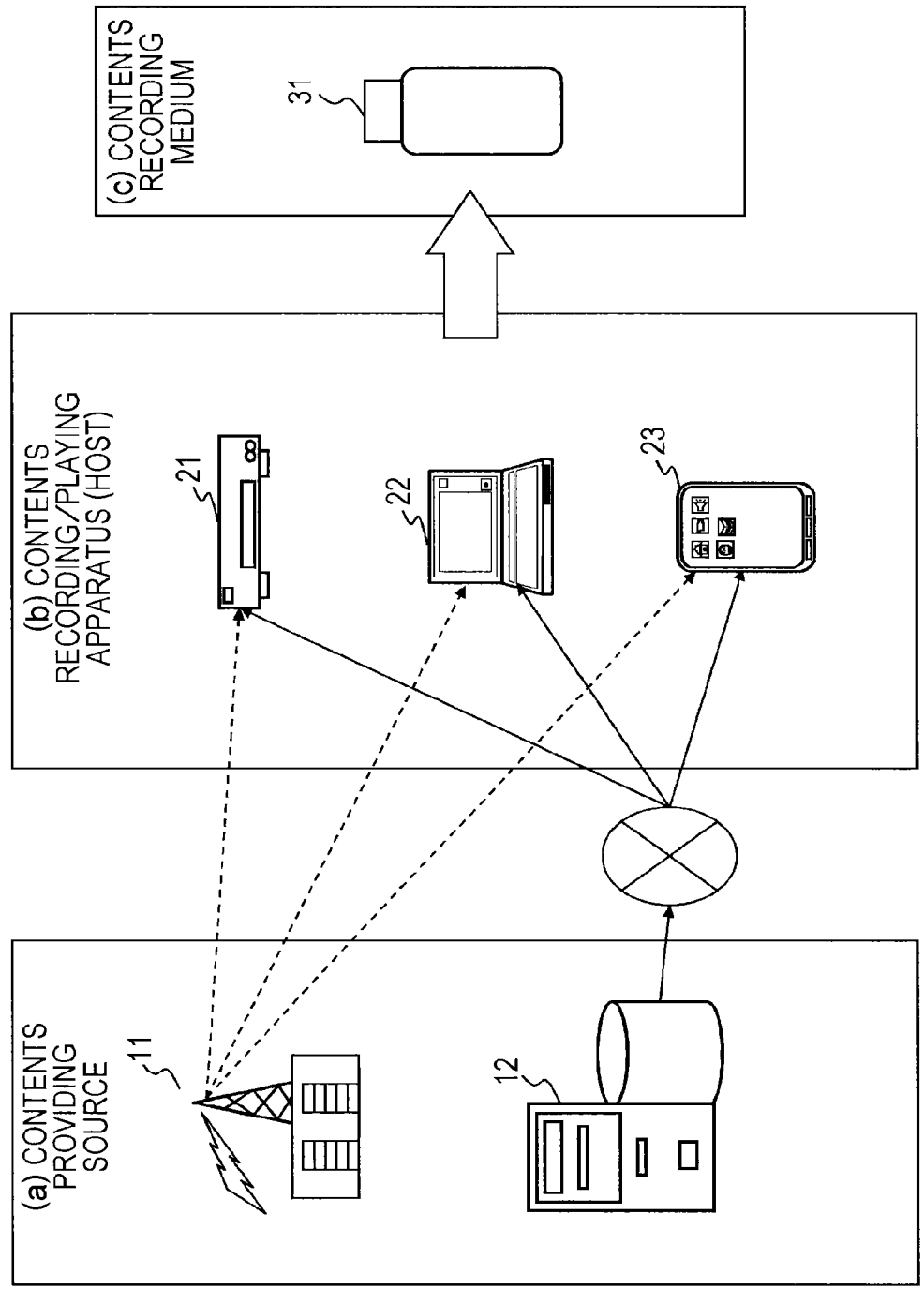
FIG. 1 is a diagram for describing overviews of content providing processing and usage processing.

FIG. 1 illustrates the following examples from the left.
(a) Content Providing Source
(b) Content Recording/Playing Apparatus (Host)
(c) Content Recording Medium (c) Content Recording Medium is a medium to be used for playback processing of a content that has been recorded by a user. Here, for example, this indicates a memory card 31 which is an information recording apparatus such as flash memory or the like.

The user records various contents such as music, movies, and so forth in the memory card 31 and uses these. A content serving as an object of usage control such as a content serving as an object of copyright to be managed, or the like, is included in those contents, for example.

The content serving as an object of usage control mentioned here is a content of which unauthorized copying, distribution of copied data, or the like are prohibited. Note that in the case of recording a usage control content in the memory card 31, usage control information (Usage Rule) corresponding to the content thereof, specifically, usage control information (Usage Rule) wherein copy restriction information such as the allowable number of times of copying and so forth is stipulated is also recorded together in the memory card 31.

(a) Content Providing Source is a providing source of a content such as music, movies, or the like. FIG. 1 illustrates a broadcasting station 11, and a content server 12 as content providing sources, for example. The broadcasting station 11 is, for example, a television station, and provides user devices [(b) Content Recording/Playing Apparatus (Host)] with various broadcast contents over ground waves or satellite waves via a satellite. The content sever 12 is a server for providing contents such as music, movies, and so forth via a network such as the Internet or the like.

For example, an arrangement may be made wherein the user mounts the memory card 31 which is (c) Content Recording Medium on (b) Content Recording/Playing Apparatus (Host), receives the content provided from the broadcasting station 11 or content server 12 via a reception unit of (b) Content Recording/Playing Apparatus (Host) itself, or a reception device connected to (b) Content Recording/Playing Apparatus (Host), and records the content in the memory card 31.

(b) Content Recording/Playing Apparatus (Host) mounts the memory card 31 which is (c) Content Recording Medium, and records the content received from the broadcasting station 11 or content server 12 which is (a) Content Providing Source, in the memory card 31.

Examples of (b) Content Recording/Playing Apparatus (Host) include a device only for recording/playing (CE device: Consumer Electronics device) 21 including a hard disk, or a disc such as DVD, BD, or the like, for example, such as a DVD player or the like, and further include a PC 22, a portable terminal 23 such as a smart phone, cellular phone, portable player, tablet terminal, or the like. These are all devices on which the memory card 31 which is (c) Content Recording Medium can be mounted.

The user uses the device only for recording/playing 21, PC 22, portable terminal 23, or the like to receive a content such as music, a movie, or the like from the broadcasting station 11 or content server 12, and records in the memory card 31.

The usage mode of a content recorded in the memory card 31 will be described with reference to FIG. 2. The memory card 31 is a recording medium attachable/detachable as to a content player such as a PC or the like, and can freely be detached from a device which has executed recording of a content, and mounted on another user device.

Figure 2:
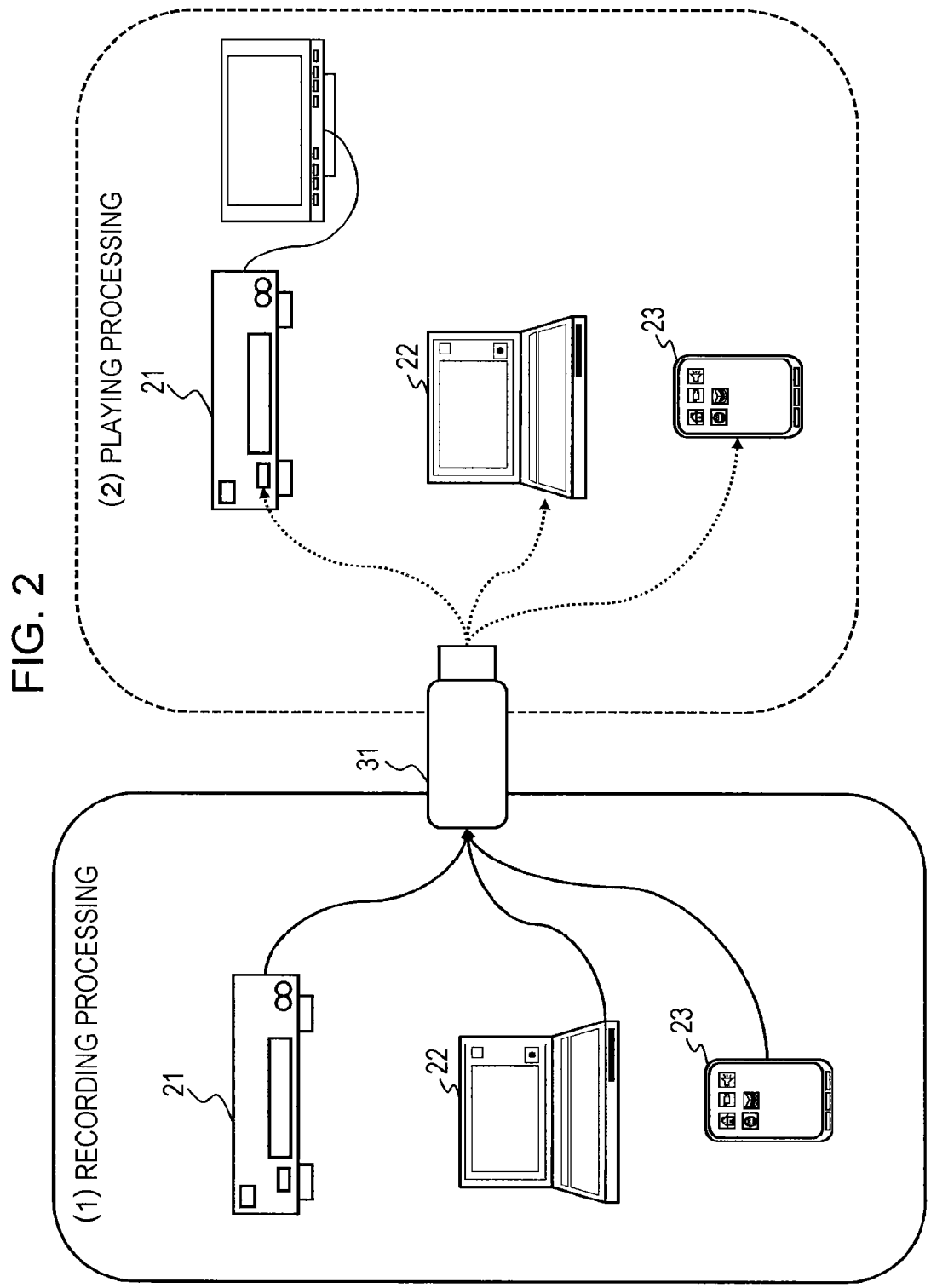
FIG. 2 is a diagram for describing a usage mode of a content recorded in a memory card.

Specifically, as illustrated in FIG. 2, execution devices of the following processes do not have to be the same, and the user can freely selectively use a recording device and a playing device.
(1) Recording Processing
(2) Playback Processing Note that, in many cases, a usage control content recorded in the memory card 31 is recorded as an encrypted content, and a content playing apparatus such as the device only for recording/playing 21, PC 22, portable terminal 23, and so forth perform content playback after executing decryption processing in accordance with a predetermined sequence.

2. Configuration Example and Usage Example of Memory Card

Next, description will be made regarding a configuration example and a usage example of a memory card such as flash memory or the like to be used as a content recording medium. A specific configuration example of the storage area of the memory card 31 is illustrated in FIG. 3.

Figure 3:
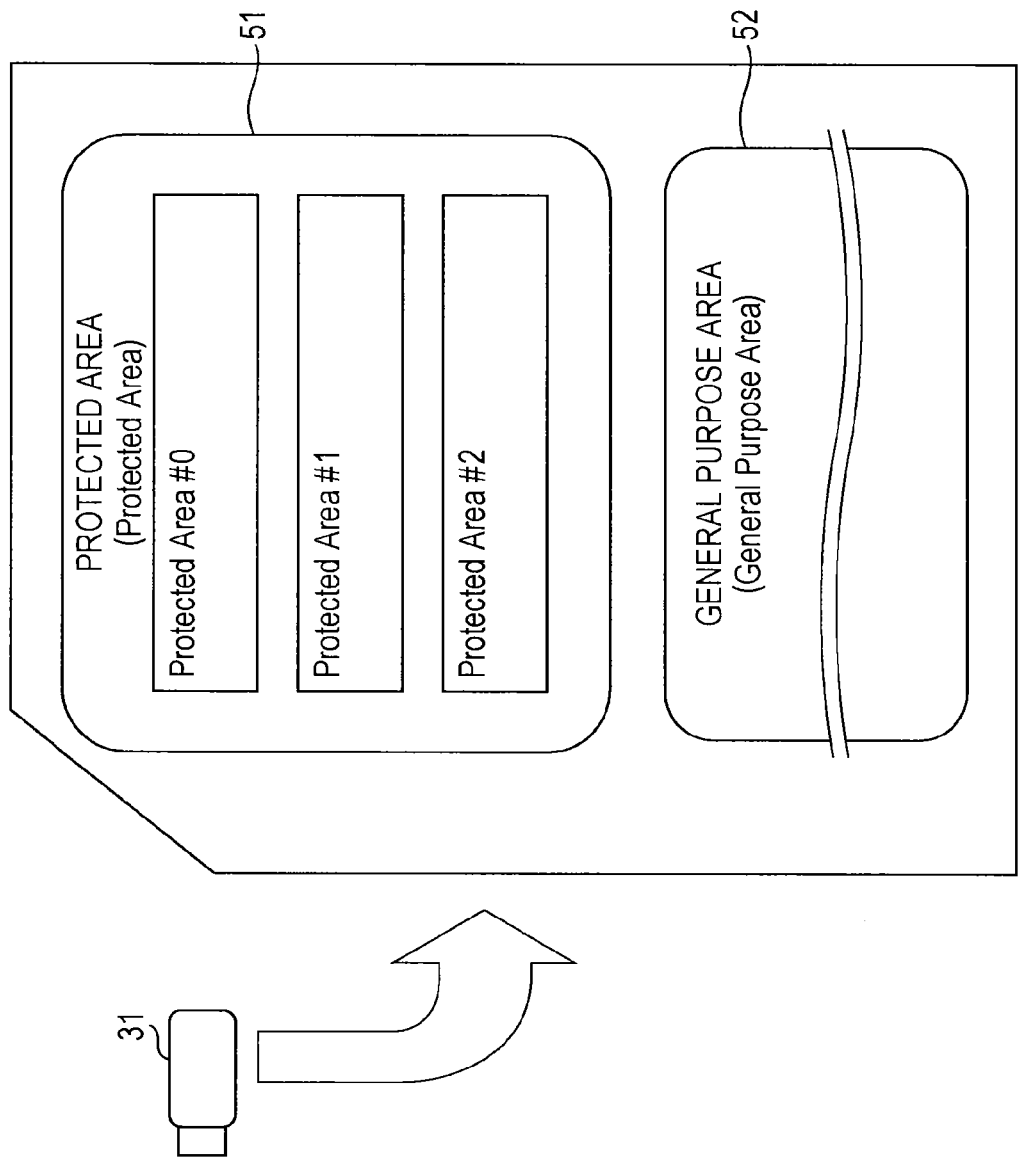
FIG. 3 is a diagram for describing a specific configuration example of a storage area of the memory card.

The storage area of the memory card 31 is, as illustrated in FIG. 3, configured of the following two areas.
(a) Protected area (Protected Area) 51 and
(b) General purpose area (General Purpose Area) 52

(b) General purpose area (General Purpose Area) 52 is an area which can freely be accessed by a recording/playing apparatus which the user uses, in which contents, general content management data, and so forth are recorded, e.g., an area where writing or reading of data can freely be performed by a server or the user's recording/playing apparatus, for example.

On the other hand, (a) Protected area (Protected Area) 51 is an area of which free access is not permitted. For example, in the case of attempting to perform writing or reading of data using a recording/playing apparatus which the user uses, or a server to be connected via a network, or the like, a data processing unit of the memory card 31 determines whether reading (Read) or writing (Write) can be performed according to each apparatus in accordance with a program stored in the memory card 31 beforehand.

The memory card 31 includes a data processing section for executing the program stored beforehand, and an authentication processing section for executing authentication processing, and first performs authentication processing with a device which attempts to execute writing or reading of data as to the memory card 31.

With a stage of this authentication processing, the memory card 31 receives a device certificate such a public key certificate or the like from a partner terminal, i.e., access requesting apparatus. For example, in the case that the access requesting apparatus is a server, the memory card 31 receives a server certificate (Server Certificate) that the server possesses, and uses information described in the certificate thereof to determine whether or not access of each segment area is of the protected area (Protected Area) 51 is permitted. Also, in the case that the access requesting device is, for example, a recording/playing apparatus (host) serving as a user machine which executes recording/playing of a content, the memory card 31 receives a host certificate (Host Certificate) possessed by the recording/playing apparatus (host), and uses information described in the certificate thereof to determine whether or not access of each section area of the protected area (Protected Area) 51 is permitted.

This access privileges determination processing is performed in increments of section areas (regions #0, #1, #2, and so on illustrated in the drawing) within the protected area (Protected Area) 51 illustrated in FIG. 3, and the memory card 31 permits only processing (processing such as reading/writing of data, etc.) permitted in permitted section areas, and causes the server or host to execute the processing thereof.

Reading/writing restriction information (PAD Read/PAD Write) as to this medium is set in increments of devices to perform access, e.g., content servers, or recording/playing apparatuses (hosts). Such information is recorded in a server certificate (Server Certificate) corresponding to each device, or host certificate (Host Certificate). Note that, hereafter, "Certificate" will be referred to as "Cert" in a simplified manner.

In this way, the memory card 31 verifies recorded data of the server certificate (Server Cert) or host certificate (Host Cert) in accordance with a stipulated program stored beforehand in the memory card 31, and performs processing to permit access regarding only an access-permitted area.

3. Certificate Having Access Permission Information as to Protected Area

Next, description will be made regarding a configuration example of a certificate of which presentation as to the memory card is involved in the case of performing access as to the protected area (Protected Area) 51 of the memory card 31 described above, with reference to FIG. 4.

As described above, the memory card 31 performs authentication processing with a device which attempts to execute writing or reading of data as to the memory card 31. With a stage of this authentication processing, the memory card 31 receives a device certificate such as a public key certificate or the like (e.g., server certificate (Server Cert) or host certificate (Host Cert) from the partner device, i.e., the access requesting apparatus, and uses information described in the certificate thereof to determine whether to permit access of each section area of the protected area (Protected Area) 51.

Description will be made regarding a configuration example of a host certificate (Host Cert) to be stored in a user machine (host machine) such as the recording/playing apparatus 21, PC 22, portable terminal 23, or the like illustrated in FIG. 1 as an example of a device certificate used for this authentication processing, with reference to FIG. 4.

The host certificate (Host Cert) is provided to each user machine (host machine) by the certificate authority which is a public key certificate issuer, for example. For example, the host certificate (Host Cert) is a certificate of a user machine to be issued to a user machine (host machine) of which the content usage processing has admitted by the certificate authority, and is a certificate in which a public key and so forth are stored. The host certificate (Host Cert) is configured as data in which a signature has been set by a certificate authority secret key to restrain tampering. Note that the device certificate may be stored beforehand in memory within the device based on device confirmation such as the type of the device, and so forth at the time of manufacturing of a device. In the case of obtaining a device certificate after the user's purchase, an arrangement may be made wherein confirmation processing of a device type, the type of an available content, and so forth in accordance with a predetermined sequence between the device, the certificate authority or another management authority is performed to issue a device certificate to each device, and to store in memory within the device.

Note that a server which performs access to the protected area of the memory card 31 holds a server certificate (Server Cert) in which a server public key having the same configuration as the host certificate, and access permission information of the memory card is recorded.

Figure 4:
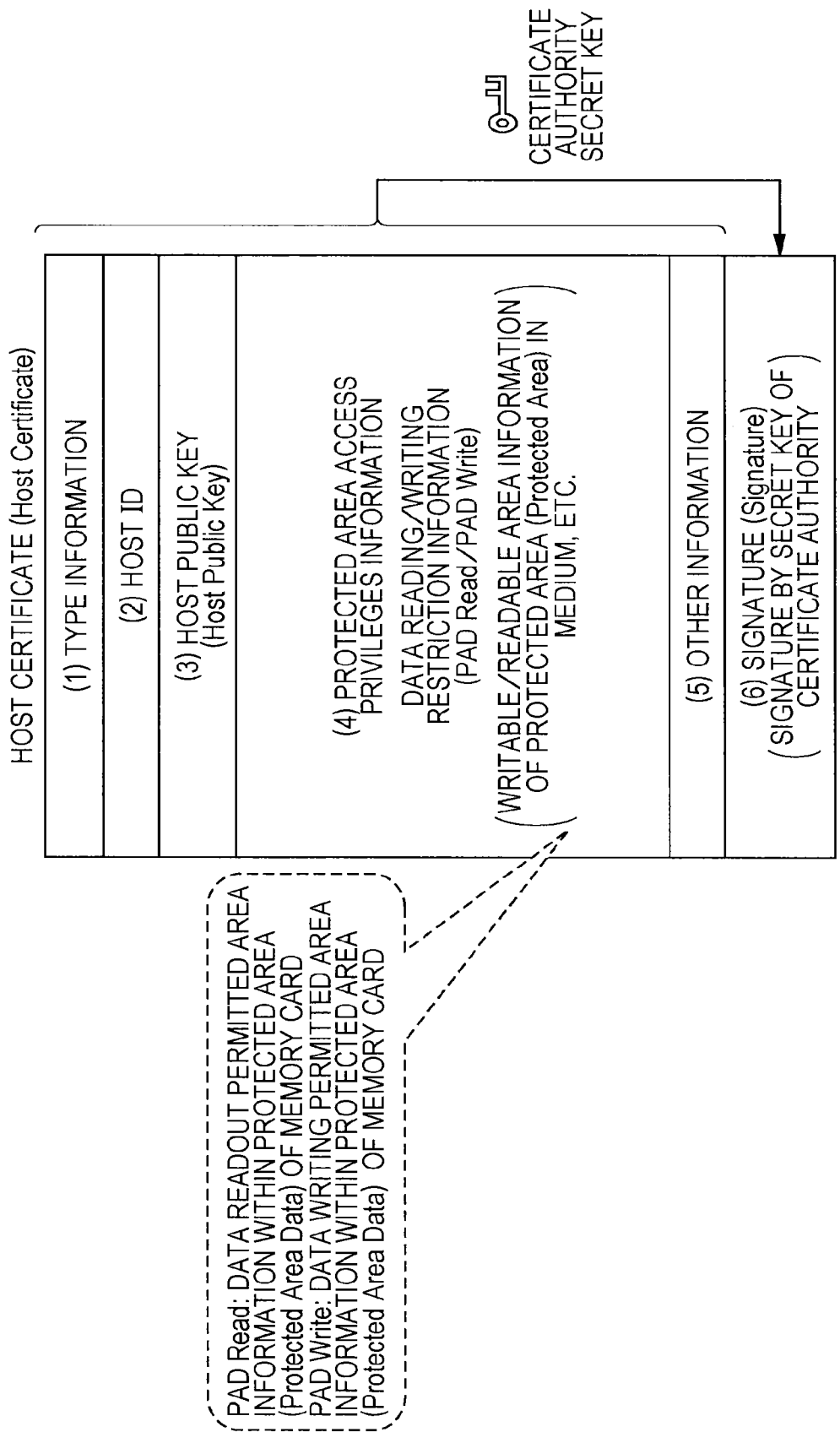
FIG. 4 is a diagram for describing a host certificate (Host Certificate)

FIG. 4 indicates a specific example of the host certificate (Host Cert) with which the certificate authority provides each host machine (user machine).

The host certificate (Host Cert) includes the following data as indicated in FIG. 4.
(1) Type information
(2) Host ID (User machine ID)
(3) Host public key (Host Public Key)
(4) Protected area access privileges information (reading/writing restriction information as to the protected area of the medium (PAD Read/PAD Write))
(5) Other information
(6) Signature Hereafter, each data of the above (1) through (6) will be described.
(1) Type Information The type information is information indicating the type of the certificate, or the type of the user machine, in which data indicating that the present certificate is a host certificate, and information indicating the type of the machine, e.g., the type of the machine such as a PC or music player, and so forth are recorded.

(2) Host ID

The host ID is an area where a device ID serving as device identification information is recorded.
(3) Host Public Key (Host Public Key)

The host public key is a public key of a host machine. This makes up a key pair in accordance with the public key cryptosystem along with a secret key to be provided to the host machine (user machine).
(4) Protected Area Access Privileges Information (Reading/Writing Restriction Information as to the Protected Area of the Medium (PAD Read/PAD Write))

With the protected area access privileges information, there is recorded information regarding a medium in which a content is recorded, e.g., a section area of which reading (Read) and writing (Write) of data within the protected area (PDA: Protected Area) 51 to be set in the storage area of the memory card 31 illustrated in FIG. 3, for example.
(5) Other information, (6) Signature With the host certificate, various types of information other than the above (1) through (4) is recorded, and signature data as to information in (1) through (5) is recorded. Signature is executed by a secret key of the certificate authority. In the case of extracting and using information recorded in the host certificate, e.g., a host public key, signature verification processing to which the public key of the certificate authority has been applied is first executed to confirm that there is no tampering of the host certificate, and certificate stored data such as a host public key is used with confirmation thereof being performed as a condition.

Note that, though FIG. 4 is a host certificate where access permission information of a user machine (host machine) as to the protected area of the memory card is recorded, a certificate [server certificate (e.g., public key certificate in which a server public key is stored] where access permission information as to the protected area of the memory card is recorded is provided to a server of which access has to be made to the protected area, in the same way as with the host certificate indicated in FIG. 4.

4. Access Processing Example as to Memory Card to Which Each Device Certificate Has Been Applied As described with reference to FIG. 4, in the case of performing access to the protected area (Protected Area) 51 of the memory card 31, a certificate as indicated in FIG. 4 has to be presented to the memory card. The memory card confirms the certificate indicated in FIG. 4, and determines whether or not access to the protected area (Protected Area) 51 of the memory card 31 illustrated in FIG. 3 can be performed.

The host machine holds a host certificate (Host Cert) described with reference to FIG. 4, and a server which performs providing of contents holds a certificate (server certificate: Server Certificate) corresponding to the server, for example.

In the case that each of these devices performs access to the protected area (Protected Area) of the memory card, each device has to provide the memory card with a possessed certificate thereof to receive determination based on verification on the memory card side regarding whether or not access can be performed.

Description will be made regarding an access restriction setting example in the case that the access requesting apparatus as to the memory card is a host machine such as a recording/playing apparatus or the like, with reference to FIG. 5.

Figure 5:
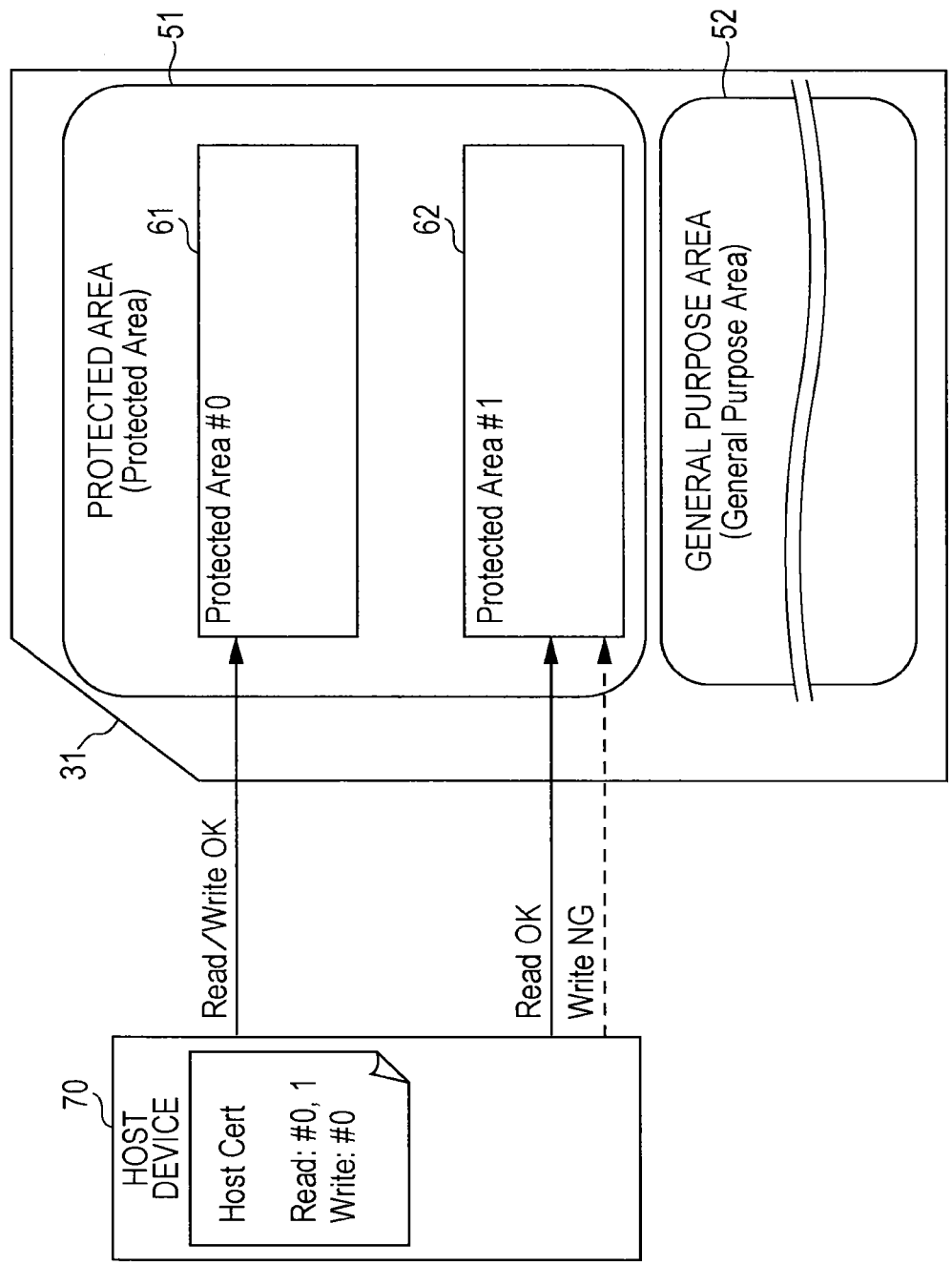
FIG. 5 is a diagram for describing a specific configuration example of the storage area of the memory card and an example of access control processing.

FIG. 5 illustrates a host (recording/playing apparatus) 70 which is an access requesting device as to the memory card, and the memory card 31 from the left. The host (recording/playing apparatus) 70 is a user machine such as the device only for recording/playing 21, PC 22, portable terminal 23, shown in FIG. 1, or the like, and is a device which executes content recording processing as to the memory card 31, or playing of a content recorded in the memory card 31.

At the time of outputting a content received from a broadcasting station or server, or a content stored in a storage unit of the device itself to the memory card 31 for recording, the host (recording/playing apparatus) 70 executes processing for writing a title key to be applied to encryption or decryption processing of a content, or encrypted or converted data of a title key in the protected area (Protected Area) 51 of the memory card 31.

Also, in the case of playing an encrypted content recorded in the memory card 31, the host (recording/playing apparatus) 70 executes processing for obtaining a title key written in the protected area (Protected Area) 51 of the memory card 31, or an encrypted or converted data of a title key. The host (recording/playing apparatus) 70 has to perform access to the protected area (Protected Area) 51 of the memory card 31 in the content recording/playback processing in this way.

The memory card 31 includes the protected area (Protected Area) 51 and general purpose area (General Purpose Area) 52, and encrypted contents and so forth are recorded in the general purpose area (General Purpose Area) 52. A title key which is a key used for content playback is recorded in the protected area (Protected Area) 51.

As previously described with reference to FIG. 3, the protected area (Protected Area) 51 is divided into multiple areas. With an example illustrated in FIG. 5, an example having the following two section areas is illustrated. Section area #0 (Protected Area#0) 61 and Section area #1 (Protected Area#1) 62, Various settings may be performed as for setting modes of these section areas. FIG. 5 indicates protected area access privileges information of a host certificate (Host Cert) that the host (recording/playing apparatus) 70 holds.

With access control information of the host certificate indicated in FIG. 5, the following settings are performed. Both processes of writing (Write) and reading (Read) of data are permitted as to Section area#0 (Protected Area#0).

Only reading (Read) process is permitted as to Section area#1 (Protected Area#1).

With the host certificate (Host Cert) indicated in FIG. 5, writing (Write) permission as to Section area#1 (Protected Area#1) is not set. For example, a certificate where such protected area access privileges information is recorded is provided to a user machine.

A device which attempts to access the protected area (Protected Area) 51 of the memory card 31 outputs a certificate where this protected area access privileges information is recorded to the memory card. The memory card determines based on the certificate verification processing in the data processing section within the memory card regarding whether or not access can be performed. The host (recording/playing apparatus) 70 accesses the protected area (Protected Area) 51 of the memory card 31 in accordance with determination information.

In this way, the protected area (Protected Area) of the memory card is configured as an access control area where permission or non-permission of writing (Write) and reading (Read) of data has been set in increments of access requesting apparatuses, and also in increments of section areas (#0, #1, #2, and so on).

The protected area access privileges information is, as described with reference to FIG. 4, recorded in the certificate (server certificate, host certificate, etc.) of each access requesting apparatus, and the memory card first performs signature verification regarding the certificate received from the access requesting apparatus, and after confirming validity, reads access control information described in the certificate, i.e., the following information.

Reading permission area information (PAD Read), and
Writing permission area information (PAD Write)

Based on such information, the memory card permits and executes only processing admitted as to the access requesting apparatus.

Note that, as for host machines as well, there are various types of machines, for example, such as CE devices such as recorders, players, and so forth, PCs, and so forth. Device certificates are certificates individually held by these devices, and may have a different setting according to the types of these devices.

Also, based on the following information recorded in a device certificate, i.e., Reading permission area information (PAD Read), and
Writing permission area information (PAD Write), and further not only these information but also type information (Type) included in the certificate described with reference to FIG. 4, the data processing section of the memory card may perform access permission determination in increments of the section areas of the protected area.

5. Processing Example Between Host (Playing Apparatus) and Medium (Memory Card)

Next, description will be made regarding a processing example between a host (playing apparatus) which executes playback processing of a content stored in a medium (memory card) and the medium (memory card).

5-1. First Embodiment

Processing Example Between Host and Medium Using Device Certificate According to Content Type First, as for a first embodiment of a processing example between the host (playing apparatus) and the medium (memory card), a processing example employing a device certificate according to content type will be described.

There are various types of contents provided from a broadcasting station or content server to a user machine.

For example, there are various contents such as movie contents, music contents, moving image contents, and still image contents.

Further, for example, out of movie contents as well, there are movie contents soon after being released to the public, and movie contents regarding which a certain amount of time has elapsed after being released to the public.

In the event of unauthorized copies of a new content such as a new movie soon after being released to the public circulating, a problem occurs wherein the content value thereof rapidly decreases, and the profits of a copyright holder and distribution right holder thereof markedly drop. On the other hand, with regard to old contents such as an old movie regarding which several years have elapsed after being released to the public and regarding which the sales peak of DVDs or the like has passed, the profit levels of the copyright holder and distribution right holder have already decreased, so even if unauthorized copies are generated, the influence thereof will be small comparatively.

In this way, values differ according to the types of contents, and there are high value-added contents which should have stricter prevention from illegal usage, and contents other than those. With the following description, contents to be subjected to stricter prevention from illegal usage will be referred to as high value-added contents (Enhanced Contents), and contents other than the high value-added contents will be referred to as normal contents (Basic Contents).

In response to the present situations in which such various types of contents exist, as for an example of a countermeasure for enhancing protection of high value-added contents (Enhanced Contents), a processing example employing a device certificate according to content type will be described. The device certificate shall be a host certificate (Host Cert) previously described with reference to FIG. 4, for example. As described with reference to FIGS. 4 and 5, with the device certificate, there are recorded access privileges in increments of section areas (#0, #1, #2, and so on) of the protected area (Protected Area) of the memory card, and specifically, various types of access privileges information such as permission only for reading (Read), permission only for writing (Write), permission for reading/writing (Read/Write), and so forth.

A plurality of this device certificate is issued according to contents types, and one content certificate shall be taken as a content certificate that can be used only for a particular type of content.

Figure 6:
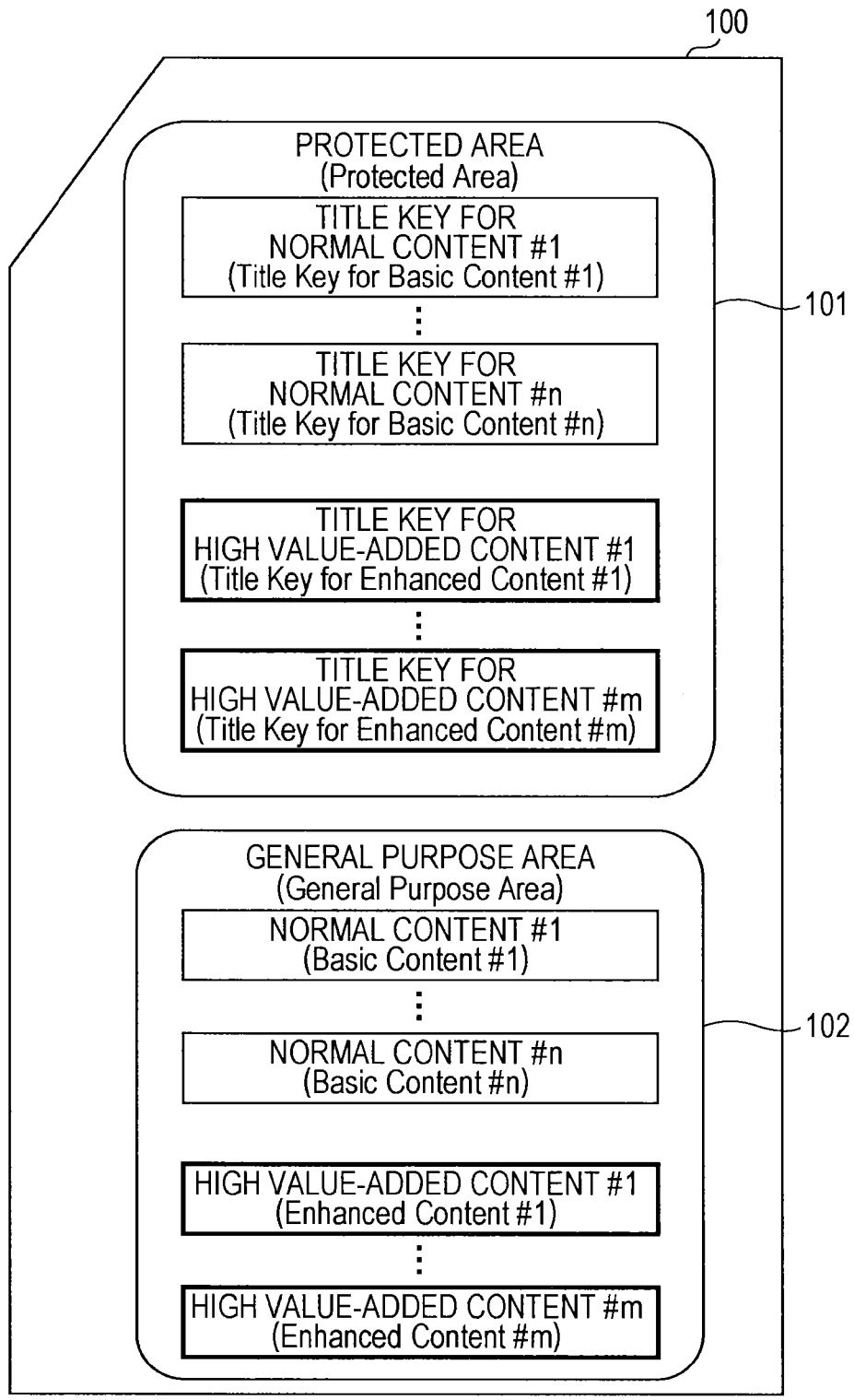
FIG. 6 is a diagram for describing an example of stored data of a memory card.

FIG. 6 illustrates a storage example of an encrypted content recorded in a memory card 100, and a title key to be applied to decryption of the encrypted content.

The memory card 100 is, as described above, divided into the following two areas.
  Protected area (Protected Area) 101, and
  General purpose area (General Purpose Area) 102

Encrypted contents are recorded in the general purpose area (General Purpose Area) 102. As illustrated in the drawing, the contents are divided into the following two types.
(a) Normal contents (Basic Contents)
(b) High value-added contents (Enhanced Contents)

The contents are recorded as settings whereby content types can be distinguished, e.g., regarding whether (a) normal contents (Basic Contents) or (b) high value-added contents (Enhanced Contents) can be distinguished. For example, the contents are recorded along with meta data in which the contents types of these are recorded. These contents are encrypted contents, and at the time of content playback, decryption processing using a title key corresponding to each content (title) has to be performed.

Title keys are recorded in the protected area (Protected Area) 101. Note that a title key may be recorded as encrypted or converted data. This is one of the countermeasures against leakage.

As illustrated in FIG. 6, title keys recorded in the protected area (Protected Area) 101 are also briefly classified into the following two types in the same way as the types of encrypted contents.
(a) Title key for normal content (Title Key for Basic Content)
(b) Title key for high value-added content (Title Key for Enhanced Content)

The title keys are recorded as settings whereby content types decrypted by title keys can be distinguished, e.g., regarding whether (a) normal contents (Basic Contents) or (b) high value-added contents (Enhanced Contents) can be distinguished. For example, the title keys are recorded along with meta data in which the contents types of these are recorded. Note that these two types of title keys may be set to be stored in a different section area for each type, and may be set so as to distinguish the corresponding content type based on a recorded section. In this case, access control may be executed under access privileges having different section increments.

In the case of performing content playback, the playing apparatus (host) which executes content playback processing, e.g., a playing apparatus such as a device only for recording/playing, PC, portable terminal, or the like has to read out a title key corresponding to the content to be played from the protected area of the memory card. In order to perform this title key readout processing, the playing apparatus (host) presents the device certificate (Cert) to the memory card.

Here, as described above, the device certificate is set as a device certificate according to the content type. A configuration example of the host certificate (Host Cert) according to the content type is illustrated in FIG. 7.

FIG. 7 illustrates an example of the following two types of host certificates (Host Cert).
(A) Host certificate (Host Cert) that can be used for playing both of high value-added contents and normal contents
(B) Host certificate (Host Cert) that can be used for playing normal contents alone The host certificates (Host Cert) illustrated in FIG. 7 are certificates where the following data is recorded, in the same way as previously described with reference to FIG. 4.
(1) Type information
(2) Host ID (user device ID)
(3) Host public key (Host Public Key)
(4) Protected area access privileges information (reading/writing restriction information as to the protected area of the medium (PAD Read/PAD Write))
(5) Other information
(6) Signature (Signature)

However, the host certificate illustrated in FIG. 7 differs in that the following information is recorded in (1)
  Type information.
(1a) Device type information
(1b) Corresponding content type information "(1a) Device type information" is information indicating what kind of device the host holding this host certificate (Host Cert) is. Specifically, for example, this information is information indicating which type of device of the following the host is.
  Device only for recording/playing,
  PC, or
  Portable terminal (Tablet-type terminal or the like)

"(1b) Corresponding content type information" is information indicating the content type of a title key which is permitted to obtain from the memory card using this host certificate (Host Cert). Specifically, this information is information indicating whether or not this host certificate can be used for obtaining a title key corresponding to any of the following contents or both contents.
  High value-added content (Enhanced Content), and
  Normal content (Basic Content)

As described above, with a device certificate, the device type indicating the device type of the device itself, and the corresponding content type information indicting the type of a content corresponding to a title key that can be obtained by applying the device certificate are recorded therein.

An example of combination of the following information will be described with reference to FIG. 8.
(1a) Device type information
(1b) Corresponding content type information As illustrated in FIG. 8, (1a) Device type information is classified into the following two types.
Device only for recording/playing (code: 0x0001)
PC/Portable terminal (Tablet-type terminal or the like) (code: 0x0002)

Note that this type classification is an example, and may be classified further finely.

Also, (1b) Corresponding content type information is classified into the following three types.
Corresponding to only normal contents (code: 0x0001)
Corresponding to only high value-added contents (code: 0x0002)
Corresponding to both of high value-added contents and normal contents (code: 0x0003)

Note that this type classification is an example, and may be classified further finely. For example, classification according to the types of various contents, such as moving image contents, movie contents, still image contents, moving image contents, and so forth, may be set.

Next, the sequence of content playback processing using the device certificate corresponding to a content type will be described with reference to the flowcharts illustrated in FIGS. 9 through 11.

Figure 11:
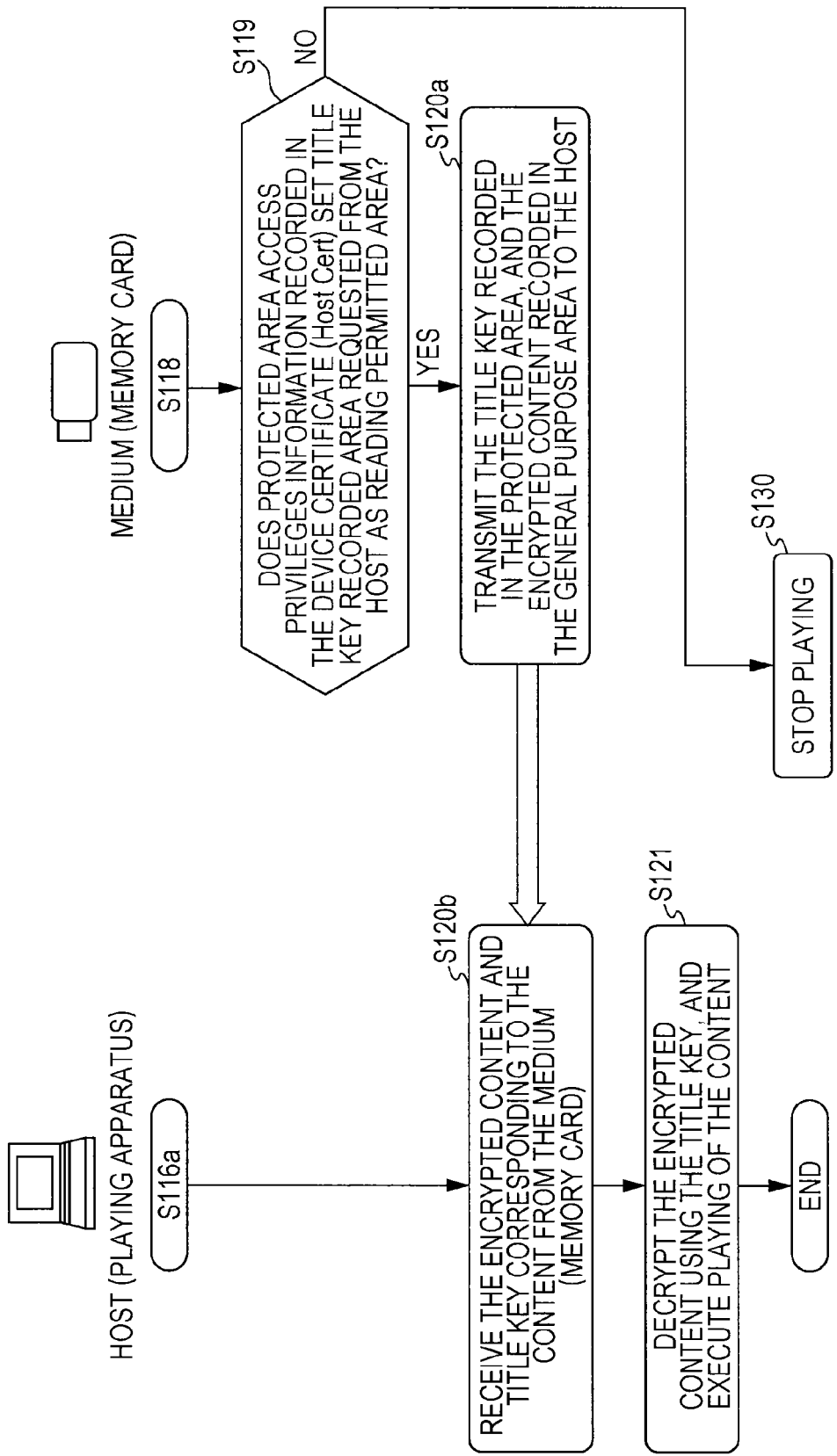
FIG. 11 is a diagram illustrating a flowchart for describing the content usage sequence to be executed by selectively activating a playing program according to content type and using the host certificate (Host Certificate) correlated with the activated playing program.

The flowcharts illustrated in FIGS. 9 through 11 sequentially illustrate a host (playing apparatus) for executing content playback on the left side; and a medium (memory card) in which an encrypted content and a title key are stored on the right side, and sequentially illustrate processes executed by these two devices. The details of the processing of the steps will be described.

The host (playing apparatus) on which the medium (memory card) is mounted inputs selection information of a content to be played in step S111. For example, the host (playing apparatus) displays a list of contents stored in the memory card on a display of the host, and the user selects a content to be played from the displayed content list, and accordingly, the data processing section of the host identifies the user's specified selected content.

In step S112, the host activates a playing program according to the type of the selected content.

With the present processing example, the type of the content is one of the following (a) and (b).
(a) Normal content, and
(b) High value-added content Note that, with each content, information indicating a content type is recorded in attribute information (meta data) correlated with the content, and the content type is discriminated based on this attribute information. Alternatively, an arrangement may be made wherein a content file is recorded as a setting having a different extension according to the content type, and the content is discriminated with reference to this extension. Alternatively, a program to be activated may automatically be selected according to the extension.

The host holds a normal content playing program for executing playback processing of a normal content, and a high value-added content playing program for executing playback processing of a high value-added content, and activates the playing program corresponding to the type of the content selected as an object to be played. Note that, though the host may have the normal content playing program alone, such a host fails to execute playback processing of a high value-added content. Also, the high value-added content playing program may be set so as to play only high value-added contents, or may be set to be a program capable of playing both of high value-added contents and normal contents.

Next, in step S113, the host obtains a device certificate (Host Cert) correlated with the playing program activated according to the type of the content from the memory of the device itself. This device certificate (Host Cert) is a host certificate (Host Cert) previously described with reference to FIG. 7, and is a certificate in which the following information is recorded as type information.
(1a) Device type information
(1b) Corresponding content type information Note that, for example, the normal content playing program may obtain a host certificate alone corresponding to just a normal content, indicated in (B) in FIG. 7, and the high value-added content playing program may obtain a host certificate alone corresponding to a high value-added content and a normal content, indicated in (A) in FIG. 7. For example, with information for obtaining a host certificate recorded in each playing program (e.g., memory address), only information (address) corresponding to the host certificate of any one of (A) and (B) in FIG. 7 is recorded, each playing program may obtain an only host certificate that can be used by the program itself.

Next, in steps S114a and S114b, mutual authentication processing between the host (playing apparatus) and the medium (memory card) is executed. With this mutual authentication processing, the host (playing apparatus) transmits the host certificate (Host Cert) obtained from the memory of the host to the medium (memory card).

On the other hand, the medium (memory card) transmits a device certificate for media (Media Cert) stored in the memory within the medium (memory card) to the host (playing apparatus). This authentication processing is executed as mutual authentication processing of the public key cryptosystem to which these both of the public key certificates have been applied, for example.

Next, processing in steps S115a and S115b and thereafter illustrated in FIG. 10 will be described. In steps S115a and S115b, determination is made regarding whether or not the mutual authentication between the host (playing apparatus) and the medium (memory card) has been established.

In the case that the mutual authentication has not been established, determination is made that reliability between both devices has failed to be confirmed, the flow proceeds to step S130, and the content playback processing is stopped.

In the case that the mutual authentication has been established, the flow proceeds to steps S116a and S116b.

In step S116a, the host (playing apparatus) transmits a title key reading request corresponding to the content to be played to the medium (memory card).

In step S116b, the medium (memory card) receives this title key reading request.

Next, in step S117, the medium (memory card) determines whether or not the host certificate (Host Cert) received from the host (playing apparatus) is a host certificate (Host Cert) in which the corresponding content type information corresponding to the type of the content corresponding to a title key that the host requests is recorded, with reference to the type information of the host certificate (Host Cert) received from the host (playing apparatus) at the time of the previous authentication information.

For example, an arrangement is assumed wherein the two types of host certificates (Host Cert) illustrated in FIG. 7 are available. In the case that the content scheduled to be played is a normal content, and the title key that the host requests is a title key corresponding to the normal content, even when the host certificate received from the host is either of the following two certificates illustrated in FIG. 7,
(A) Host certificate (Host Cert) that can be used for playing of both of a high value-added content and a normal content, and
(B) Host certificate (Host Cert) that can be used for playing of a normal content alone,
determination in step S117 is Yes.

Also, in the case that the content scheduled to be played is a high value-added content, and the title key that the host requests is a title key corresponding to the high value-added content, only when the host certificate received from the host is the following illustrated in FIG. 7,
(A) Host certificate (Host Cert) that can be used for playing of both of a high value-added content and a normal content,
the determination in step S117 is Yes.

When the host certificate received from the host is the following illustrated in FIG. 7,
(B) Host certificate (Host Cert) that can be used for playing of a normal content alone,
the determination in step S117 is No.

In the case that the determination in step S117 is No, the flow proceeds to step S130, playing of the content is stopped. That is to say, providing of the title key as to the host is not executed.

In the case that determination is made that the host certificate (Host Cert) received from the host (playing apparatus) is a host certificate (Host Cert) in which the corresponding content type information corresponding to the type of the content corresponding to a title key that the host requests is recorded, the determination in step S117 is Yes, and the flow proceeds to step S118.

Next, in step S118, the medium (memory card) confirms whether or not the stored area of the title key that the host requests, i.e., a section area of the protected area has been set as a data reading permitted area, with reference to the protected area access privileges information of the host certificate (Host Cert) received from the host (playing apparatus) at the time of the previous authentication processing.

As previously described with reference to FIGS. 4 and 5, permission information of access privileges (reading/writing) in increments of section areas of the protected area of the memory card is recorded in the protected area access privileges information region of the host certificate (Host Cert). The medium (memory card) determines whether or not the stored area of the title key that the host requests, i.e., the section area of the protected area has been set as the data reading permitted area, with reference to this protected area access privileges information.

In the case that, in step S119 illustrated in FIG. 11, the section area of the protected area where the title key that the host requests is stored has not been recorded in the host certificate (Host Cert) as the data reading permitted area, the determination in step S119 is No.

In this case, the flow proceeds to step S130, and content playback is stopped. That is to say, providing of the title key as to the host is not executed.

On the other hand, in the case that the section area of the protected area where the title key that the host requests is stored has been recorded in the host certificate (Host Cert) as the data reading permitted area, the determination in step S119 is Yes, and the flow proceeds to step S120.

In step S120a, the medium (memory card) obtains the title key requested from the host (playing apparatus) from the protected area, and further obtains an encrypted content from the general purpose area, and transmits to the host.

In step S120b, the host (playing apparatus) receives the title key and encrypted content from the medium (memory card).

Next, in step S121, the host (playing apparatus) executes decryption processing of the encrypted content by applying the obtained title key to start content playback.

5-2. Second Embodiment

Processing Example for Selecting Device Certificate Applied by Playing Program

With the content playback sequence according to the first embodiment described with reference to the flowchart illustrated in FIGS. 9 through 11, an arrangement has been made wherein the playing program to be activated is selected according to the type of a content selected as the content to be played, and the processing is executed using a host certificate (Host Cert) set corresponding to the selected activated playing program, i.e., one host certificate (Host Cert) set to be accessible by the selected activated playing program.

Specifically, an arrangement has been assumed wherein the playing program is set as a dedicated program according to the type of a content, such as Playing program corresponding to normal contents, or Playing program corresponding to high value-added contents, and an available host certificate (Host Cert) is assigned to each playing program one at a time.

Next, a second embodiment for performing processing different from the above first embodiment will be described with reference to the flowchart illustrated in FIGS. 12 through 14. With the present second embodiment, in the case that the playing program to be executed at the host (playing apparatus) is one playing program, i.e., in the case that the content to be played is either a normal content or a high value-added content, playback processing by the same program is performed. With the present embodiment, the playing program itself discriminates the type of a content selected as the content to be played, and according to this discrimination, a host certificate (Host Cert) to be used is selected and used.

Specifically, as the processing of the playing program, the content type is discriminated, and according to the discriminated content type, one of the following two types of host certificates (Host Cert) is selected and used.

(A) Host certificate (Host Cert) that can be used for playing of both of a high value-added content and a normal content
(B) Host certificate (Host Cert) that can be used for playing of a normal content alone Processing in the steps of the flowcharts illustrated in FIGS. 12 through 14 will be described.

Figure 12:
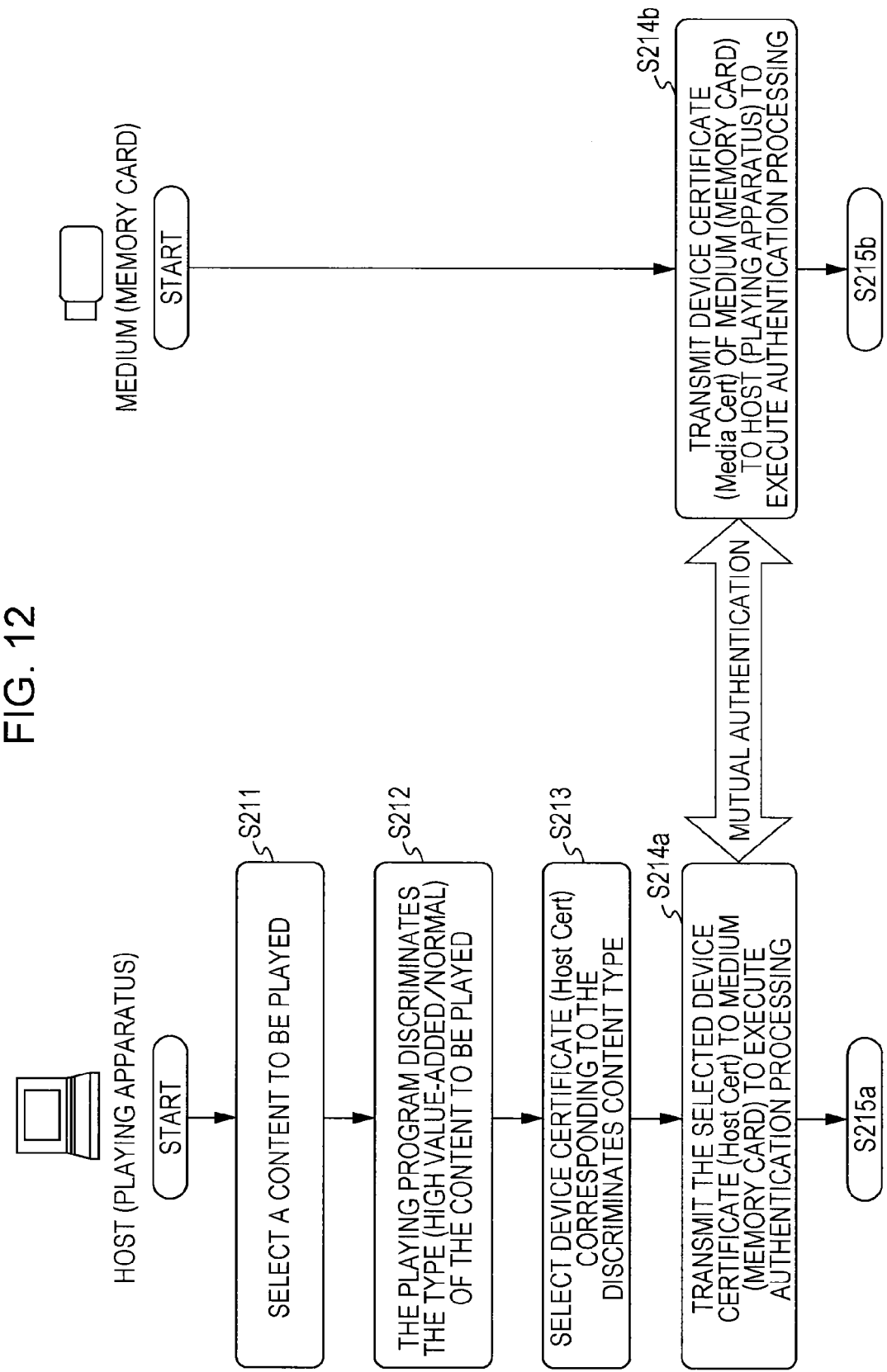
FIG. 12 is a diagram illustrating a flowchart for describing a sequence wherein the playing program selectively uses the host certificate (Host Certificate) according to content type.
Figure 13:
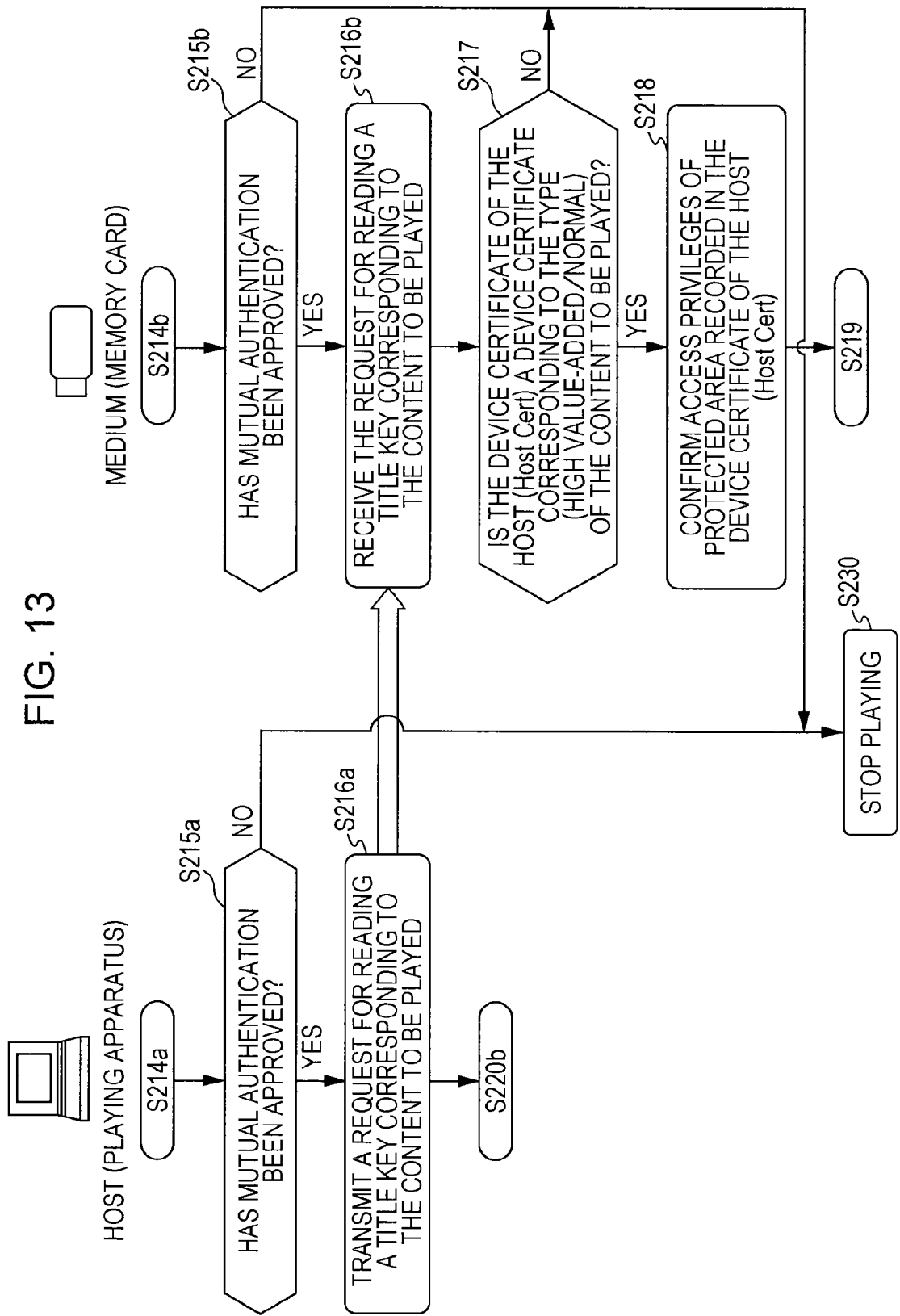
FIG. 13 is a diagram illustrating a flowchart for describing the sequence wherein the playing program selectively uses the host certificate (Host Certificate) according to content type.
Figure 14:
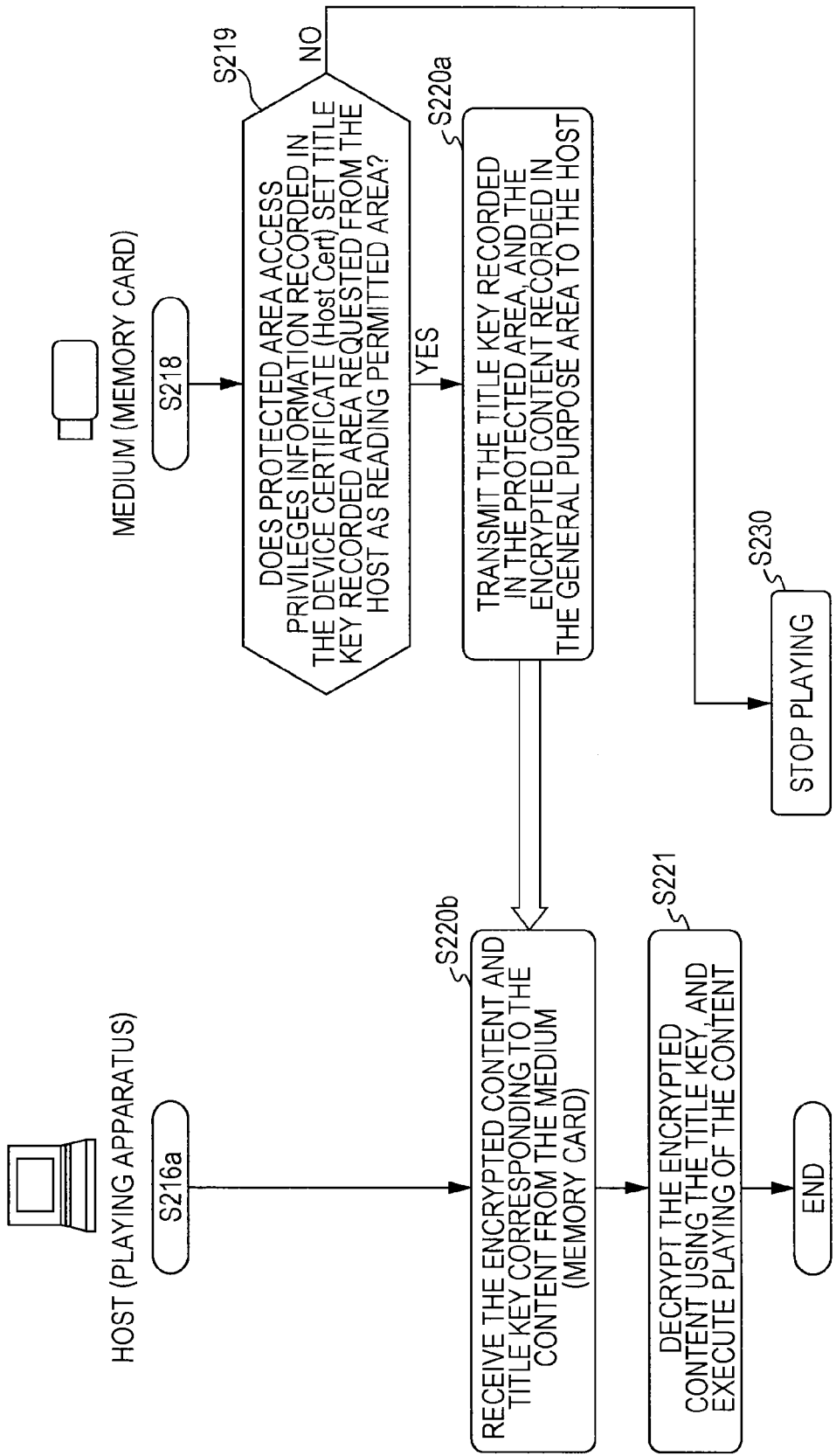
FIG. 14 is a diagram illustrating a flowchart for describing the sequence wherein the playing program selectively uses the host certificate (Host Certificate) according to content type.

The flowcharts illustrated in FIGS. 12 through 14 sequentially illustrate, in the same way as with the flowcharts in FIGS. 9 through 11, a host (playing apparatus) for executing content playback on the left side, and a medium (memory card) in which an encrypted content and a title key are stored on the right side, and sequentially illustrate processes executed by these two devices.

The host (playing apparatus) on which the medium (memory card) is mounted inputs selection information of a content to be played in step S211. For example, the host displays a list of contents stored in the memory card on the display of the host, and the user selects the content to be played from the displayed content list, and accordingly, the data processing section of the host identifies the user's specified selected content. For example, the content playing program stored in the memory of the host is activated with selection of the content to be played as a trigger.

Note that, with the processing of the flow illustrated in the previous FIGS. 9 through 11, though the activated program differs according to the type (high value-added/normal) of a content, with the present processing example, the activated program is not changed according to the type (high value-added/normal) of the selected content.

In step S212, the playing program discriminates the type of the content selected by the user. With the present processing example as well, the type of the content is one of the following (a) and (b).

(a) Normal contents
(b) High value-added contents

Note that, with each content, information indicating a content type is recorded in attribute information (meta data) correlated with the content, and the content type is discriminated based on this attribute information. Alternatively, an arrangement may be made wherein a content file is recorded as a setting having a different extension according to the content type, and the content is discriminated with reference to this extension.

Next, in step S213, the host selects and obtains a device certificate (Host Cert) to be used from the memory of the device itself according to the determined content type.

This device certificate (Host Cert) is the host certificate (Host Cert) previously described with reference to FIG. 7, and is a certificate in which the following information is recorded as type information.
(1a) Device type information
(1b) Corresponding content type information With the present example, the playing program itself performs selection of a host certificate (Host Cert) corresponding to the type of the content scheduled to be played. In the case that the content selected as the content to be played is a high value-added content, for example, a host certificate (Host Cert) is selected and obtained wherein a high value-added content is set in (1b) Corresponding content type information of the host certificate (Host Cert) described with reference to FIG. 7 as an available content. Specifically, the host certificate illustrated in (A) in FIG. 7 is selected and obtained, for example.

On the other hand, in the case that the content selected as the content to be played is a normal content, a host certificate (Host Cert) is selected and obtained wherein a normal content is set in (1b) Corresponding content type information of the host certificate (Host Cert) described with reference to FIG. 7 as an available content. Specifically, the host certificate illustrated in (B) in FIG. 7 is selected and obtained, for example. Note that, in this case, the certificate illustrated in (A) in FIG. 7 is also available for playing a normal content, and accordingly, the certificate illustrated in (A) in FIG. 7 may be selected.

However, for example, in the case that the host (playing apparatus) holds only a host certificate (Host Cert) corresponding to a normal content illustrated in (B) in FIG. 7, in the event that a high value-added content has been selected as the content to be played, an available host certificate (Host Cert) fails to be obtained, and accordingly, content playback will not be performed.

In this way, in step S213, the host (playing apparatus) selectively obtains any of the following two types of host certificates (Host Cert) according to the content type.
(A) Host certificate (Host Cert) that can be used for playing of both of a high value-added content and a normal content
(B) Host certificate (Host Cert) that can be used for playing of a normal content alone Next, in steps S214a and S214b, the host (playing apparatus) executes mutual authentication processing between the host (playing apparatus) and the medium (memory card). With this mutual authentication processing, the host (playing apparatus) transmits the host certificate (Host Cert) selected according to the content type from the memory of the host to the medium (memory card).

On the other hand, the medium (memory card) transmits the host certificate for media (Media Cert) stored in the memory within the medium (memory card) to the host (playing apparatus). This authentication processing is executed as the mutual authentication processing of the public key cryptosystem to which these both of the public key certificates have been applied, for example.

Next, the processing in steps S215a and S215b and thereafter illustrated in FIG. 13 will be described.

The processing in steps S215a through S221 illustrated in FIGS. 13 through 14 is basically the same as the processing in steps S115a through S121 of the flow previously described with reference to FIGS. 9 through 11.

In steps S215a and S215b, determination is made regarding whether or not the mutual authentication between the host (playing apparatus) and the medium (memory card) has been established. In the case that the mutual authentication has not been established, determination is made that reliability of both devices fails to be confirmed, and the flow proceeds to step S230, and the content playback processing is stopped.

In the case that the mutual authentication has been established, the flow proceeds to steps S216a and S216b.

In step S216a, the host (playing apparatus) transmits a title key reading request corresponding to the content to be played to the medium (memory card).

In step S216b, the medium (memory card) receives this title key reading request.

Next, in step S217, the medium (memory card) references the type information of the host certificate (Host Cert) received from the host (playing apparatus) at the time of the previous authentication processing to determine whether or not the host certificate (Host Cert) received from the host (playing apparatus) is a host certificate (Host Cert) in which the corresponding content type information corresponding to the type of the content corresponding to the title key that the host requests is recorded.

For example, an arrangement is assumed wherein the host certificates (Host Cert) of the two types illustrated in FIG. 7 are available.

In the case that the content scheduled to be played is a normal content, and the title key that the host requests is a title key corresponding to a normal content, the host certificate received from the host is any of the following two types of host certificates (Host Cert), determination in step S217 is Yes.
(A) Host certificate (Host Cert) that can be used for playing of both of a high value-added content and a normal content
(B) Host certificate (Host Cert) that can be used for playing of a normal content alone Also, in the case that the content scheduled to be played is a high value-added content, and the title key that the host requests is a title key corresponding to a high value-added content, only when the host certificate received from the host is the following type of host certificate (Host Cert) illustrated in FIG. 7, the determination in step S217 is Yes.
(A) Host certificate (Host Cert) that can be used for playing of both of a high value-added content and a normal content When the host certificate received from the host is the following type of host certificate (Host Cert) illustrated in FIG. 7, the determination in step S217 is No.
(B) Host certificate (Host Cert) that can be used for playing of a normal content alone In the case that the determination in step S217 is No, the flow proceeds to step S230, and the playing of the content is stopped. That is to say, providing of a title key as to the host is not executed.

When determination is made that the host certificate (Host Cert) received from the host (playing apparatus) is a host certificate (Host Cert) in which the corresponding type information corresponding to the type of the content corresponding to the title key that the host requests, the determination in step S217 is Yes, and the flow proceeds to step S218.

Next, in step S218, the medium (memory card) references the protected area access privileges information of the host certificate (Host Cert) received from the host (playing apparatus) at the time of the previous authentication processing to determine whether or not the stored area of the title key that the host requests, i.e., the section area of the protected area is set as the data reading permitted area.

As previously described with reference to FIGS. 4 and 5, the permission information of the access privileges (reading/writing) in increments of section areas of the protected area of the memory card is recorded in the protected area access privilege information area of the host certificate (Host Cert). The medium (memory card) references this protected area access privileges information to determine whether or not the stored area of the title key that the host requests, i.e., the section area of the protected area is set as the data reading permitted area.

In the case that the section area of the protected area in which the title key that the host requests is not recorded in the host certificate (Host Cert) as the data reading permitted area in step S219 illustrated in FIG. 14, the determination in step S219 is No.

In this case, the flow proceeds to step S230, and content playback is stopped. That is to say, providing of the title key as to the host is not executed.

On the other hand, in the case that the section area of the protected area in which the title key that the host requests is recorded in the host certificate (Host Cert) as the data reading permitted area, the determination in step S219 is Yes, and the flow proceeds to steps S220a and S220b.

In step S220a, the medium (memory card) obtains the title key requested from the host (playing apparatus) is obtained from the protected area, and further obtains an encrypted content from the general purpose area, and transmits to the host.

In step S220b, the host (playing apparatus) receives the title key and encrypted content from the medium (memory card).

Next, in step S221, the host (playing apparatus) executes decryption processing of the encrypted content by applying the obtained title key to start content playback.

5-3. Third Embodiment

Processing Example for Changing Conversion Mode of Identifier (Medium ID) of Medium (Memory Card) According to Type of Playing Device Next, a processing example for changing the conversion mode of the identifier (medium ID) of the medium (memory card) according to the type of a playing device will be described as a third embodiment of a processing example between the host (playing apparatus) and the medium (memory card).

Figure 15:
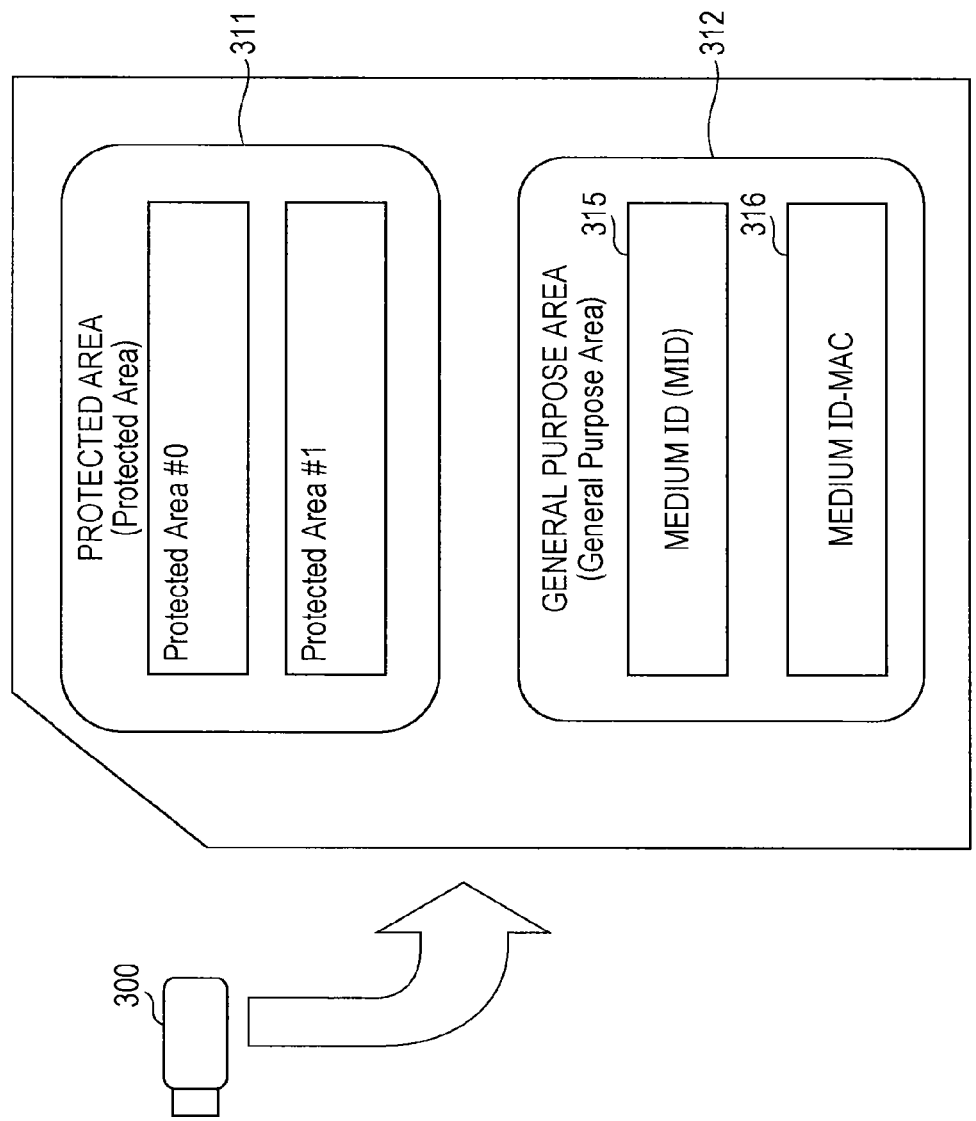
FIG. 15 is a diagram for describing an example of stored data of a memory card.

The medium (memory card) in which an encrypted content, and a title key to be applied to decryption of the encrypted content are stored holds a medium ID (MID) that is the identification information of the medium itself. As illustrated in FIG. 15, a medium (memory card) 300 includes a protected area (Protected Area) 311 where access is permitted based on access privileges information recorded in each device certificate, and a general purpose area (General Purpose Area) 312, and stores title keys in the protected area (Protected Area) 311, and stores encrypted contents in the general purpose area (General Purpose Area) 312.

In addition to encrypted contents, content usage control information (Usage Rule), and further, as illustrated in the drawing, a medium ID (MID) 315, and a medium ID-MAC (Message Authentication Code) 316 serving as a verification value thereof are recorded in the general purpose area (General Purpose Area) 312.

The medium ID (MID) 315 is the identifier of the medium (memory card), and is set as a value (medium eigenvalue) different from each of the media. The medium ID-MAC 316 is a tampering verification value of the medium ID (MID) 315, and is configured as data to which the signature of the manager is set, for example.

In the case of playing a content recorded in the medium (memory card) 300, the medium ID (MID) 315 and medium ID-MAC 316 are read out by the playing apparatus (host), and verification processing employing the MAC is executed.

According to this verification processing, the processing can be proceed to decryption of an encrypted content employing a title key with validity of the medium ID (MID) 315 being confirmed as a condition.

The content playing program stored beforehand in the playing apparatus (host) executes verification of the medium ID (MAC), and decryption of an encrypted content by applying a title key in accordance with such a predetermined playback processing sequence.

Figure 16:
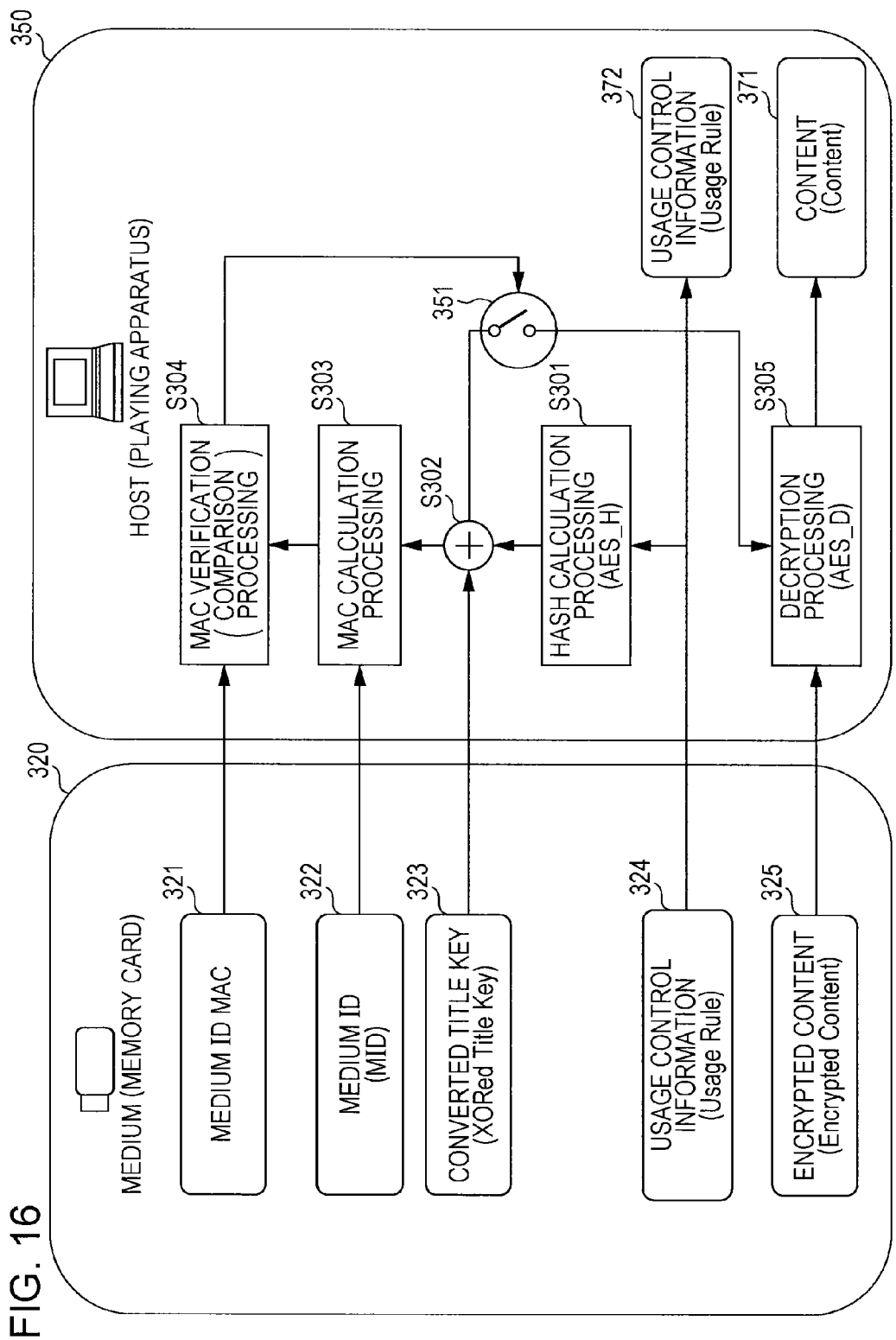
FIG. 16 is a diagram for describing a content decoding and playing sequence using a medium ID (MID)

Description will be made regarding an example of a sequence for verification of a medium ID (MAC), and encrypted content decryption processing to which a title key is applied, with reference to FIG. 16. FIG. 16 illustrates a medium (memory card) 320 in which encrypted contents and so forth are stored, and a host (playing apparatus) 350 for executing decryption and playing of an encrypted content stored in the medium (memory card) 320.

The following data is, as illustrated in the drawing, stored in the medium (memory card) 320.
Media ID-MAC 321,
Media ID (MID) 322,
Conversion title key (XORed Title Key) 323,
Usage control information (Usage Rule) 324, and
Encrypted content (Encrypted Content) 325

Note that, though various types of data are additionally stored in the medium (memory card) 320, there is illustrated only data to be applied to the sequence for verification of a medium ID (MAC), and encrypted content decryption processing to which a title key is applied.

The usage control information (Usage Rule) 324 is usage control information corresponding to the encrypted content (Encrypted Content) 325, and specifically data in which usage permission information such as permission information for copying a content, for example. The host (playing apparatus) uses the content in accordance with the stipulation of the usage control information (Usage Rule) 324 at the time of using the encrypted content (Encrypted Content) 325.

The conversion title key (XORed Title Key) 323 is converted data of a title key, and is stored in the protected area (Protected Area) of the memory card. Specifically, an exclusive OR (XOR) result between title key data and the hash value of the usage control information (Usage Rule) 324 is stored as the conversion title key.

The processing sequence of the host (playing apparatus) 350 will be described. Description will be made regarding the processing that the host (playing apparatus) 350 executes, in the sequence of steps S301 through S305 illustrated in FIG. 16.

First, in step S301, the host (playing apparatus) 350 reads out the usage control information (Usage Rule) 324 from the medium (memory card) 320, and calculates a hash value thereof, e.g., performs hash value calculation in accordance with the AES encryption algorithm.

Next, in step S302, the host (playing apparatus) 350 calculates exclusive OR (XOR) between the conversion title key (XORed Title Key) 323 and the hash value of the usage control information (Usage Rule) 324 read out from the protected area (Protected Area) of the medium (memory card) 320 in accordance with a predetermined procedure such as confirmation of access privileges, and so forth. According to this processing, a title key is generated.

Next, in step S303, the host (playing apparatus) 350 performs MAC calculation on the medium ID (MID) 322 read out from the medium (memory card) 320 by applying the title key generated in step S302.

Next, in step S304, the host (playing apparatus) 350 executes matching processing between the medium ID-MAC 321 read out from the medium (memory card) 320, and the MAC value calculated in step S303.

With this matching processing, when the medium ID-MAC 321 read out from the medium (memory card) 320 matches the calculated MAC value calculated in step S303, MAC matching is settled, determination is made that the validity of the medium (memory card) 320 has been confirmed, and the flow proceeds to encrypted content decryption processing to which the title key is applied.

On the other hand, with the matching processing, when the medium ID-MAC 321 read out from the medium (memory card) 320 does not match the calculated MAC value calculated in step S303, MAC matching is not settled, determination is made that the validity of the medium (memory card) 320 has not been confirmed, and encrypted content decryption processing to which the title key is applied is not executed.

Note that, in order to describe execution/non-execution of the processing based on this determination processing, a switch 351 is illustrated in FIG. 16. This switch 351 is illustrated for describing the processing algorithm, and does not have to be included as a configuration on the actual hardware.

With the MAC verification processing in step S304, when the medium ID-MAC 321 read out from the medium (memory card) 320 matches the calculated MAC value calculated in step S303, and the validity of the medium is confirmed, the flow proceeds to step S305.

In step S305, the host (playing apparatus) 350 executes decryption processing to which the title key generated from the conversion title key 323 is applied, on the encrypted content 325 read out from the medium (memory card) 320 to generate a content (Content) 371, and executes content usage processing such as content playback, or the like. Note that this content usage is requested to be performed as a usage mode in accordance with the rule of the usage control information (Usage Rule) 372 read out from the medium (memory card) 320.

In this way, at the time of decryption/playback processing of a content stored in the medium (memory card), validity confirmation of the media using the medium ID (MID) that is the identifier of the medium has to be performed.

On the other hand, there are various types of content devices for executing content playback. For example, as previously described with reference to FIGS. 1 and 2, there are the following various devices.

Device only for recording/playing (CE device) 21 such as DVD player, BD player, or the like

PC 22

Portable terminal 23 such as a smart phone or tablet terminal or the like

An embodiment that will be described below is an arrangement example wherein the conversion mode of the identifier (medium ID) of the medium (memory card) is changed according to the types of these various playing devices. That is to say, at the time of outputting the medium ID (MID) to the host (playing apparatus) for executing content playback, the medium (memory card) executes data conversion processing (Encode) different according to the type of the host (playing apparatus) to provides to the host (playing apparatus). The host (playing apparatus) executes restoration processing (Decode) according to the type of the device as to the conversion medium ID (MID) received from the medium (memory card) to obtain the medium ID (MID).

Figure 17:
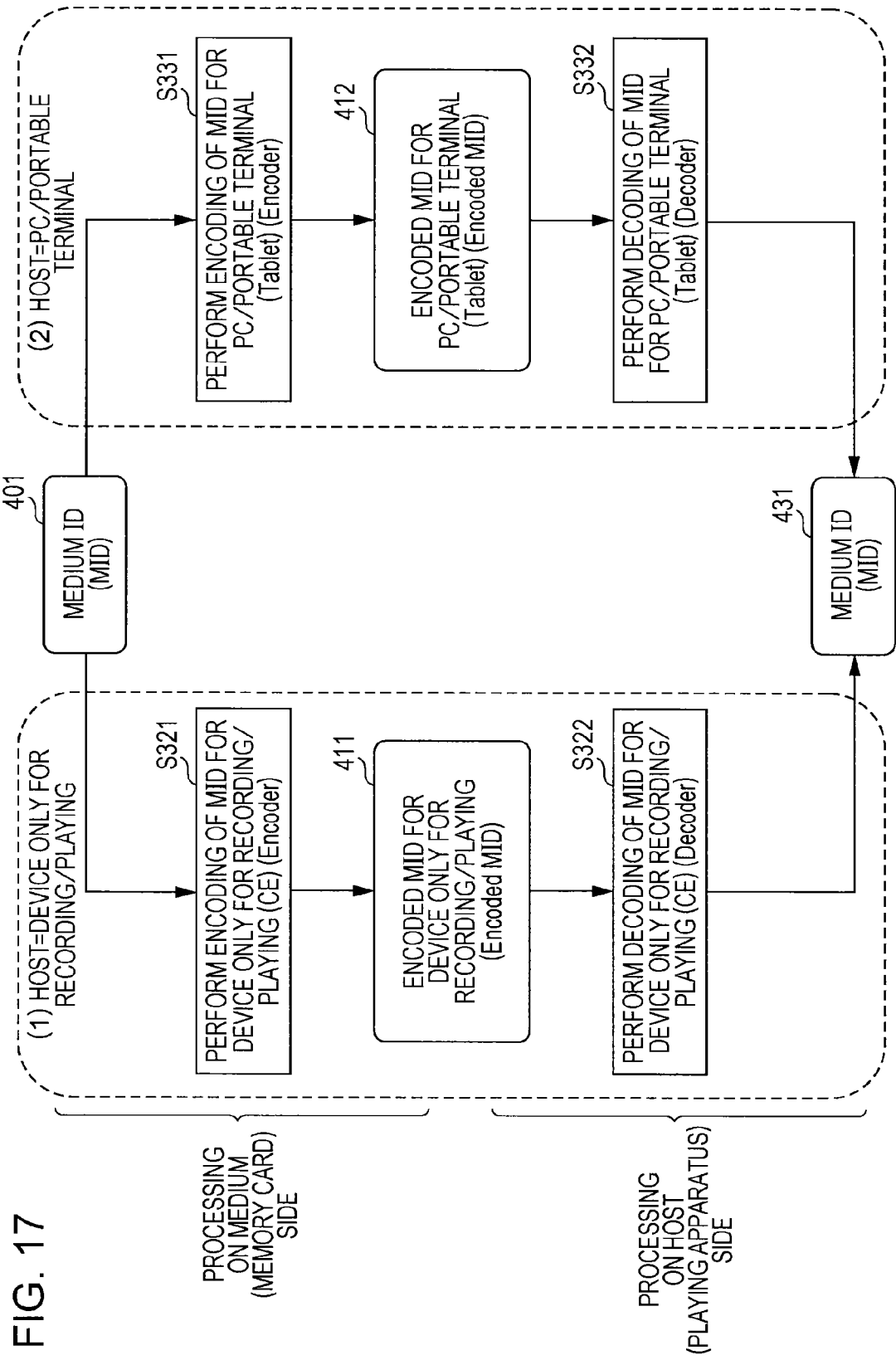
FIG. 17 is a diagram for describing processing for changing the conversion mode of a medium ID (MID) according to the type of a host (playing apparatus)

A specific example will be described with reference to FIG. 17. FIG. 17 is an example wherein devices (hosts) for executing content playback is classified into the following two types.

(1) Host=device only for recording/playing
(2) Host=PC and portable terminal

FIG. 17 illustrates an example wherein devices (hosts) are classified into these two types, and different processing is executed according to each type.

With the medium (memory card), a medium ID (MID) 401 is stored in the memory. The medium (memory card) confirms which of the following types the type of the host (playing apparatus) on which the medium (memory card) is mounted for playing a content within the medium is.

(1) Host=device only for recording/playing
(2) Host=PC and portable terminal

Confirmation is made regarding which of the above types the type of the host (playing apparatus) is.

Note that this confirmation processing of the host type (playing apparatus type) may be executed by confirming the type information (see FIGS. 7 and 8) of the host certificate (Host Cert) that the medium (memory card) receives from the host (playing apparatus), for example, at the time of the mutual authentication processing to be executed between the host (playing apparatus) and the medium (memory card).

In the case that the medium (memory card) has confirmed that the host (playing apparatus) is an device only for recording/playing, the processing of (1) Host=device only for recording/playing illustrated on the left side of FIG. 17 is executed.

On the other hand, in the case that the medium (memory card) has confirmed that the host (playing apparatus) is a PC or portable terminal, the processing of (2) Host=PC/portable terminal illustrated on the right side of FIG. 17 is executed.

With the processing of (1) Host=device only for recording/playing, in step S321 the medium (memory card) executes encoding processing (Encode) of the medium (MID) corresponding to a device only for recording/playing. An encoded MID 411 for a device only for recording/playing serving as this encoding result is provided to the device only for recording/playing which is the host (playing apparatus).

In step S322, the device only for recording/playing which is the host (playing apparatus) applies the decoding algorithm corresponding to the device only for recording/playing which the device itself includes to decode the encoded MID 411 for a device only for recording/playing received from the medium (memory card), and obtains a medium ID (MID) 431.

On the other hand, in the case of (2) Host=PC and portable terminal, in step S331 the medium (memory card) executes encoding processing (Encode) of the medium (MID) corresponding to a PC and portable terminal. A PC/portable terminal encoded MID 412 serving as this encoding result is provided to the PC or portable terminal which is the host (playing apparatus).

In step S332, the PC or portable terminal which is the host (playing apparatus) applies the decoding algorithm corresponding to the PC and portable terminal which the device itself includes to decode the PC/portable terminal encoded MID 412 received from the medium (memory card), and obtains the medium ID (MID) 431.

The medium (memory card) is configured so as to execute different multiple encoding algorithms for executing the encoding processing (Encode) of the medium (MID), and selectively applies an encoding algorithm according to the type of the host (playing apparatus), e.g., applies a first encoding algorithm in the case of Host=device only for recording/playing, and applies a second encoding algorithm in the case of Host=PC or portable terminal.

Description will be made regarding a content decryption/playing sequence in the case of executing the medium ID (MID) encoding processing according to such a type of the host (playing apparatus), with reference to FIG. 18.

Figure 18:
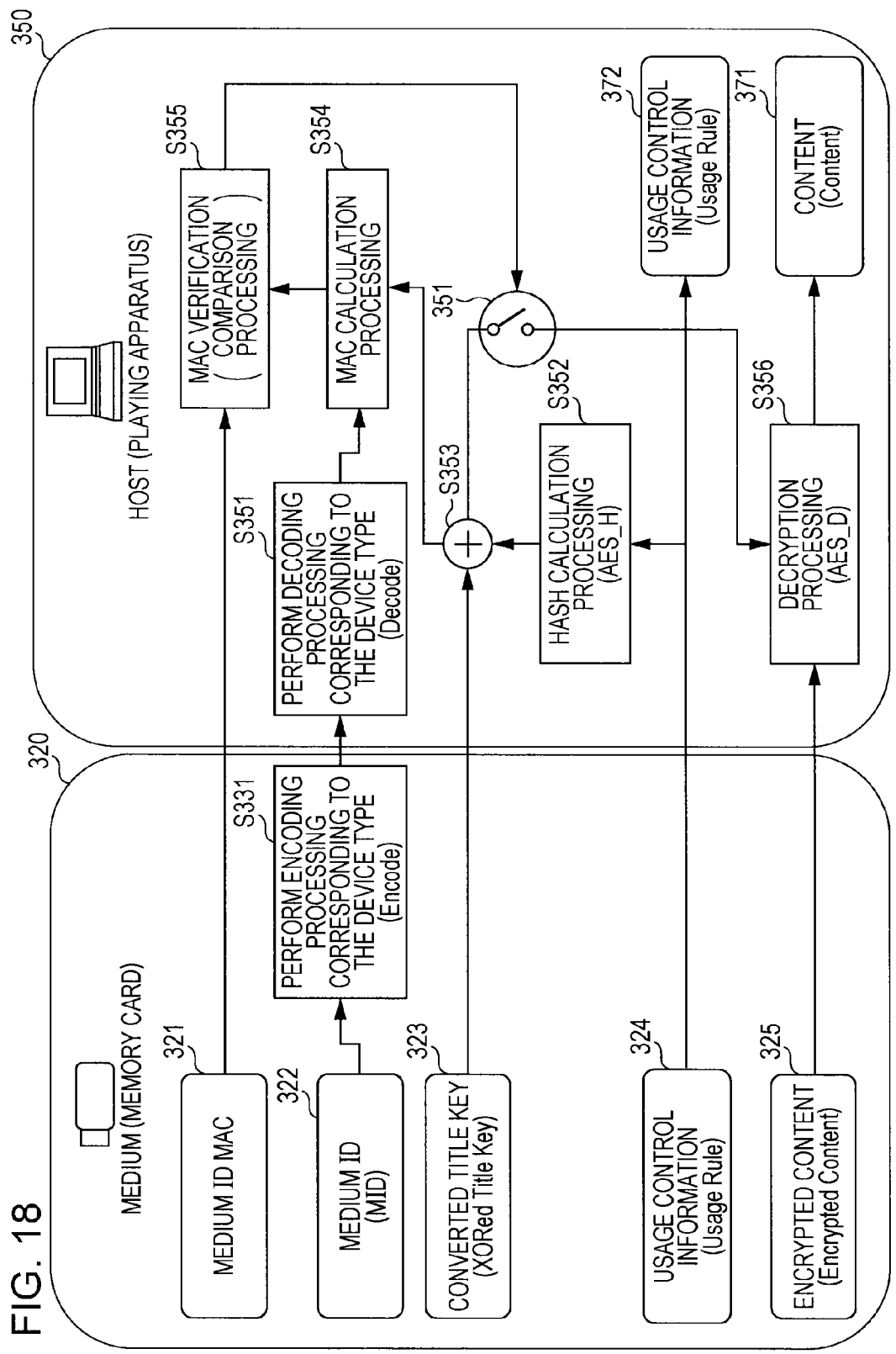
FIG. 18 is a diagram for describing content decoding and playback processing in the case of changing the conversion mode of a medium ID (MID) according to the type of a host (playing apparatus)

FIG. 18 is a diagram for describing a sequence for verification of the medium ID (MAC) and encrypted content decryption processing to which a title key is applied, in the same way as with the previously described FIG. 16. FIG. 18 illustrates, in the same way as with FIG. 16, a medium (memory card) 320 in which encrypted contents and so forth are stored, and a host (playing apparatus) 350 for executing decryption/playing of an encrypted content stored in the medium (memory card) 320.

The following data is, as illustrated in the drawing, stored in the medium (memory card) 320: Media ID-MAC 321, Media ID (MID) 322, Conversion title key (XORed Title Key) 323, Usage control information (Usage Rule) 324, and Encrypted content (Encrypted Content) 325.

Note that, though various types of data are additionally stored in the medium (memory card) 320, there is illustrated only data to be applied to the sequence for verification of a medium ID (MAC), and encrypted content decryption processing to which a title key is applied.

The conversion title key (XORed Title Key) 323 is, in the same way as previously described with reference to FIG. 16, conversion data of a title key, and is stored in the protected area (Protected Area) of the memory card. Specifically, an exclusive OR (XOR) result between title key data and the hash value of the usage control information (Usage Rule) 324 is stored as the conversion title key.

First, in step S331, the medium (memory card) 320 executes encoding processing of the medium ID (MID) 322 according to the type of the host (playing apparatus) for executing content playback.

Note that, as a premise for this processing, the medium (memory card) 320 and host (playing apparatus) 350 have executed the mutual authentication processing, and at the time of the execution processing of this mutual authentication, the medium (memory card) 320 has received the host certificate (Host Cert) from the host (playing apparatus) 350. With the host certificate (Host Cert), as previously described with reference to FIGS. 7 and 8, type information is recorded, and device type information indicating the type of the device is recorded in the type information thereof.

The medium (memory card) 320 references the type information (device type information) recorded in the host certificate (Host Cert) received from the host (playing apparatus) 350 to confirm the type of the host (playing apparatus). According to confirmation of this device type, the encoding (Encode) mode of the medium ID (MID) (encoding algorithm) is determined, and encoding processing of the medium ID (MID) is executed in accordance with the determined encoding (Encode) mode (encoding algorithm). The medium (memory card) 320 provides the encoded medium ID (MID) corresponding to the device type generated in step S331 to the host (playing apparatus) 350.

In step S351, the host (playing apparatus) 350 executes the decoding processing (Decode) of the encoded medium ID (MID) received from the medium (memory card) 320. The host (playing apparatus) 350 includes a decoding program or decoder according to the device type thereof, applies the decoding program or decoder according to the device type thereof to execute the decoding processing (Decode) of the encoded medium ID (MID).

In the case that the host (playing apparatus) 350 is a device only for recording/playing, the device only for recording/playing holds a decoding program or decoder correlated with the device only for recording/playing, and executes processing to which this decoding program or decoder has been applied. Also, in the case that the host (playing apparatus) 350 is a PC or portable terminal such as a tablet terminal or the like, the PC or portable terminal holds the decoding program or decoder correlated with the PC or portable terminal, and executes processing to which this decoding program or decoder has been applied.

The host (playing apparatus) 350 obtains the medium ID (MID) by the decoding processing in step S351. Note that, for example, regardless of the host (playing apparatus) 350 being a PC, for example, in the event of having illegally diverted the host certificate (Host Cert) of the device for recording/playing to perform processing by impersonating the device only for recording/playing, the PC fails to obtain the medium ID (MID), and fails to execute content playback thereafter. This is because, in such a case, the medium ID (MID) that the medium (memory card) provides may be decoded and obtained by the decoding program or decoder alone which the device only for recording/playing alone holds.

Processing after the host (playing apparatus) 350 obtains the medium ID (MID), i.e., processing in steps S352 through S356 is the same as the processing in steps S301 through S305 previously described with reference to FIG. 16.

In step S352, the host (playing apparatus) 350 reads out the usage control information (Usage Rule) 324 from the medium (memory card) 320, and calculates a hash value thereof, e.g., performs hash value calculation in accordance with the AES encryption algorithm.

Next, in step S353, the host (playing apparatus) 350 calculates exclusive OR (XOR) between the conversion title key (XORed Title Key) 323 and the hash value of the usage control information (Usage Rule) 324 read out in accordance with a predetermined procedure such as confirmation of access privileges, and so forth. According to this processing, a title key is generated.

Next, in step S354, the host (playing apparatus) 350 performs MAC calculation on the medium ID (MID) 322 read out from the medium (memory card) 320 by applying the title key generated in step S353.

Next, in step S355, the host (playing apparatus) 350 executes matching processing between the medium ID-MAC 321 read out from the medium (memory card) 320, and the MAC value calculated in step S354.

With this matching processing, when the medium ID-MAC 321 read out from the medium (memory card) 320 matches the calculated MAC value calculated in step S354, MAC matching is settled, determination is made that the validity of the medium (memory card) 320 has been confirmed, and the flow proceeds to encrypted content decryption processing to which the title key is applied in step S356.

On the other hand, with the matching processing in step S355, when the medium ID-MAC 321 read out from the medium (memory card) 320 does not match the calculated MAC value calculated in step S354, MAC matching is not settled, determination is made that the validity of the medium (memory card) 320 has not been confirmed, and encrypted content decryption processing to which the title key is applied in step S356 is not executed.

Note that this content usage is requested for performing as a usage mode in accordance with the rule of the usage control information (Usage Rule) 324 read out from the medium (memory card) 320.

In this way, with the present embodiment, the medium (memory card) discriminates the type of the host (playing apparatus), and according to the discriminated host type, the conversion mode of the medium ID is changed and provided to the host. The host applies the decryption algorithm corresponding to the device type included in the device itself to obtain the medium ID (MID). According to such an arrangement, the medium (memory card) may perform processing control according to the type of the host (playing apparatus).

Next, a content playback processing sequence according to the present embodiment will be described with reference to the flowcharts illustrated in FIGS. 19 through 21. That is to say, these flowcharts are flowcharts for describing a content playback processing sequence accompanying with the conversion processing of the medium ID (MID) according to the host (playing apparatus) type.

Figure 19:
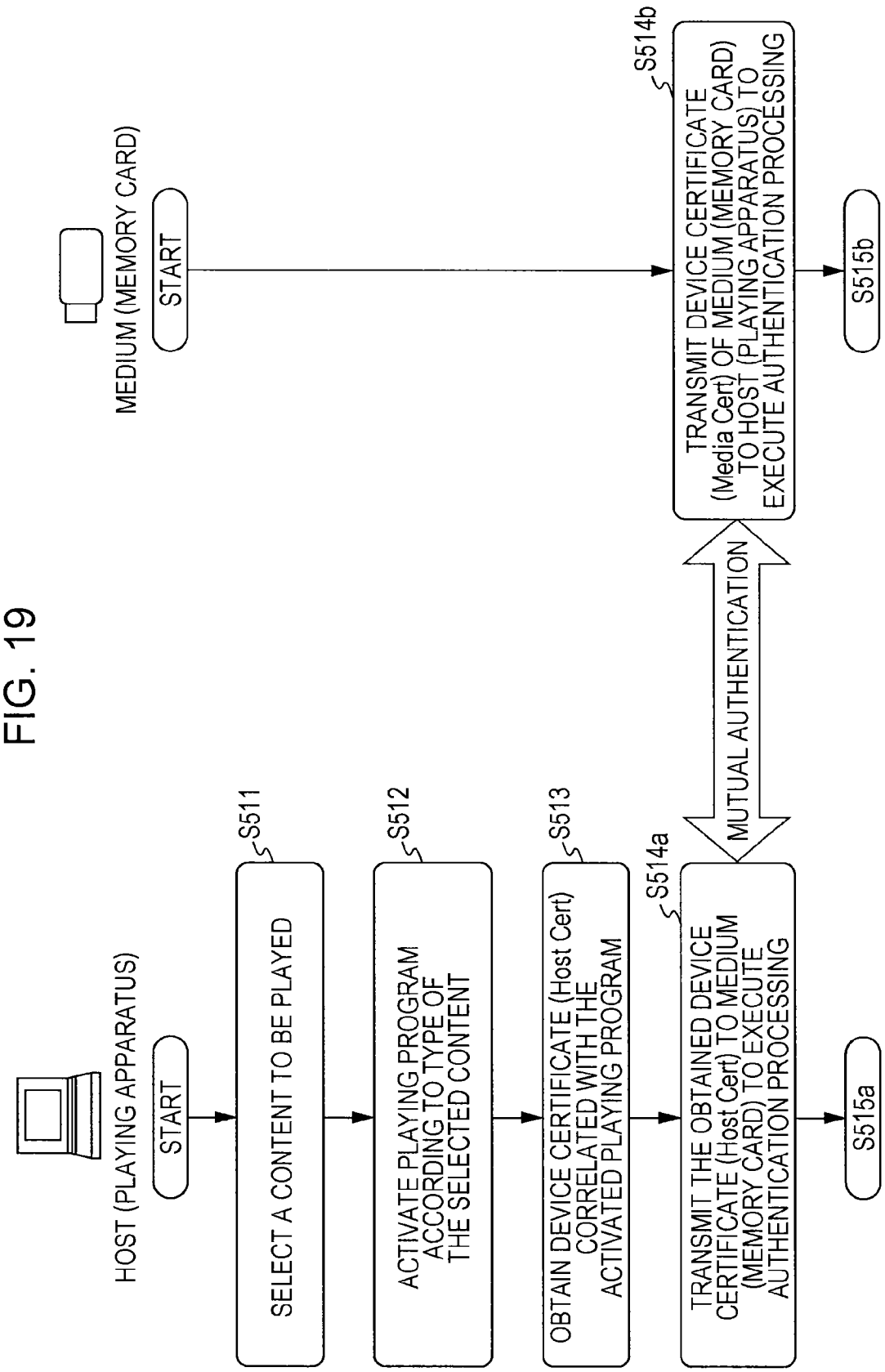
FIG. 19 is a diagram illustrating a flowchart for describing a processing sequence in the case of executing content decoding and playback processing by changing the conversion mode of a medium ID (MID) according to the type of a host (playing apparatus)
Figure 20:
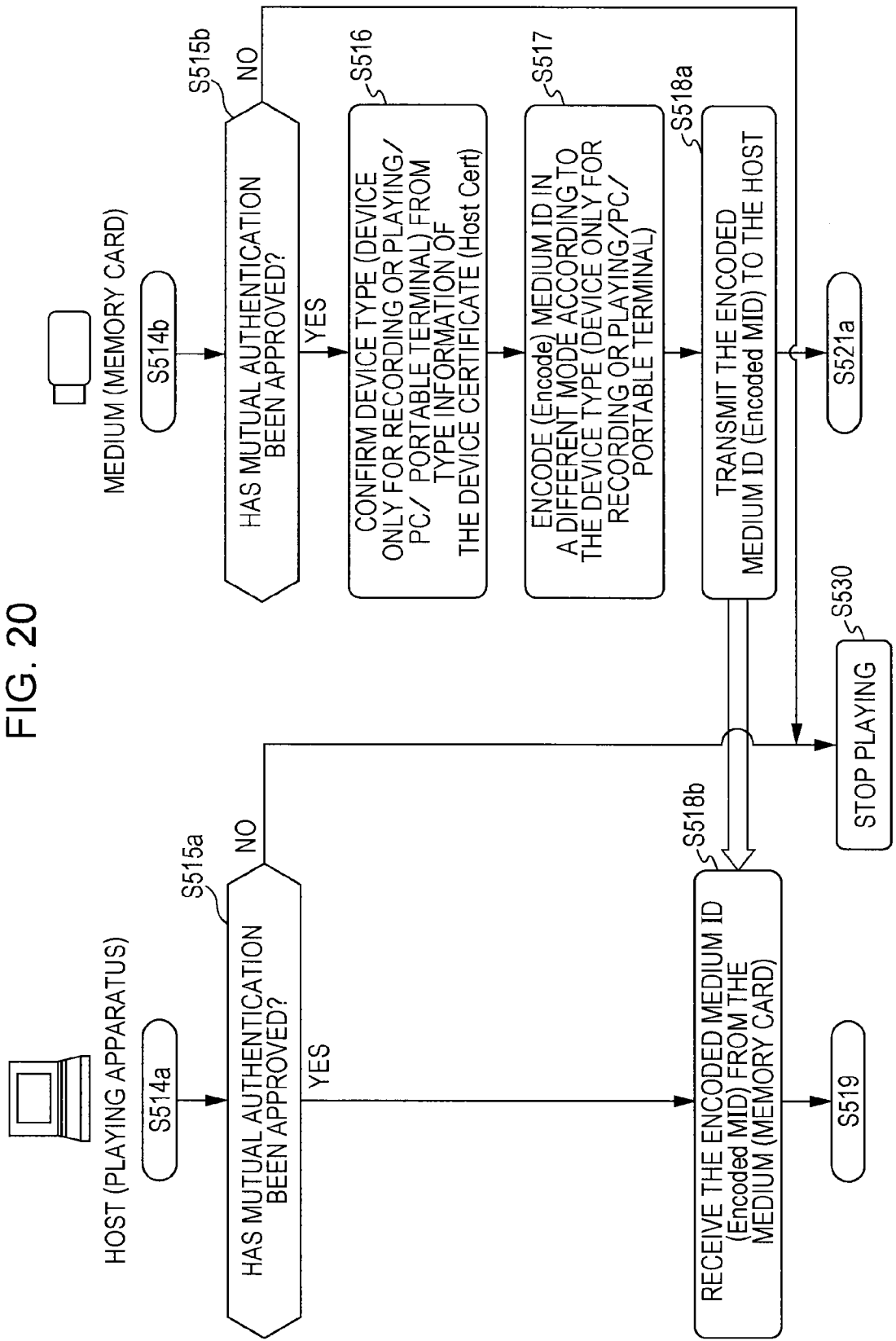
FIG. 20 is a diagram illustrating a flowchart for describing the processing sequence in the case of executing the content decoding and playback processing by changing the conversion mode of a medium ID (MID) according to the type of a host (playing apparatus)
Figure 21:
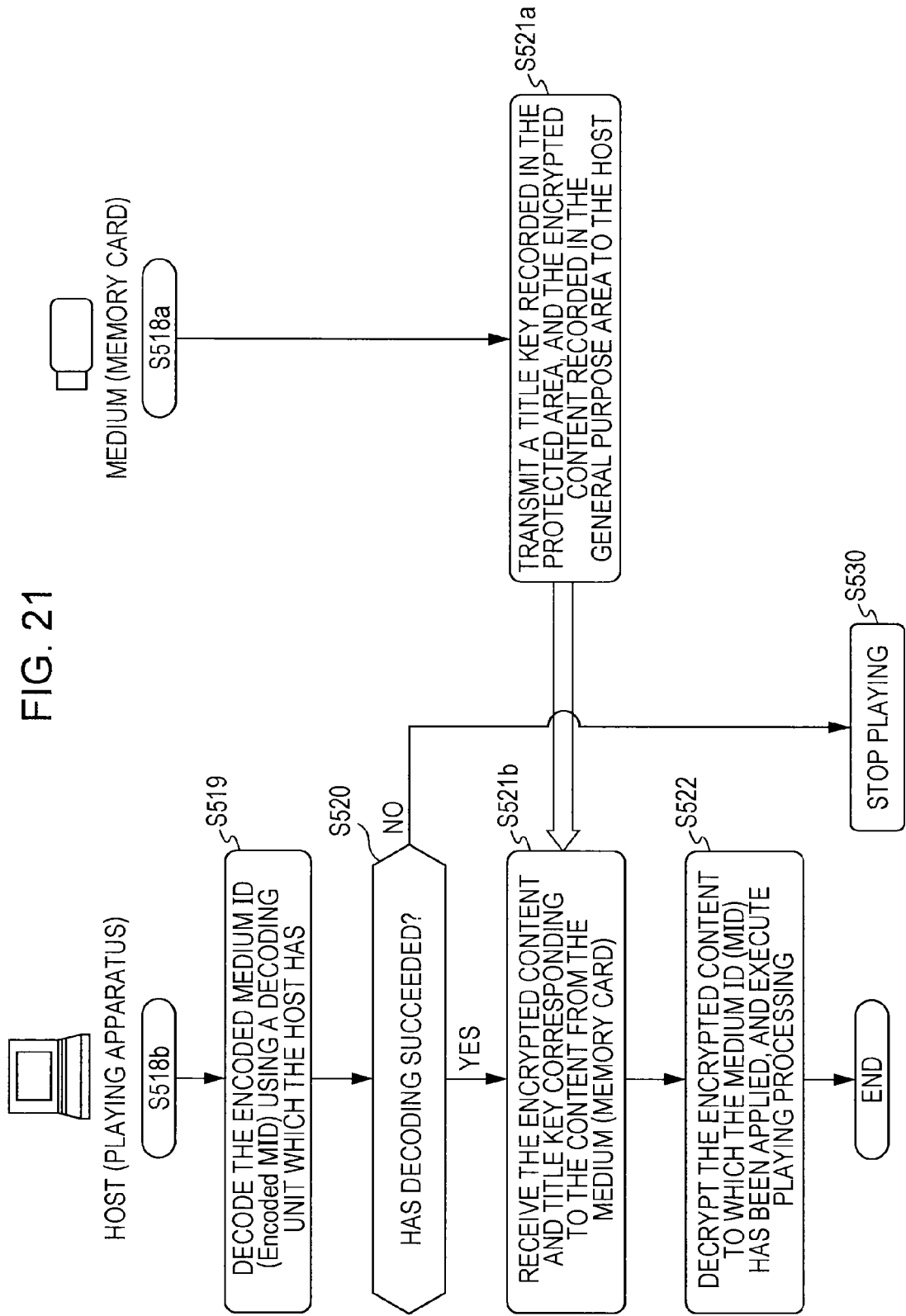
FIG. 21 is a diagram illustrating a flowchart for describing the processing sequence in the case of executing the content decoding and playback processing by changing the conversion mode of a medium ID (MID) according to the type of a host (playing apparatus)

The flowcharts illustrated in FIGS. 19 through 21 sequentially illustrate a host (playing apparatus) for executing content playback on the left side, and a medium (memory card) in which an encrypted content and a title key are stored on the right side, and sequentially illustrate processes executed by these two devices. The details of the processing of the steps will be described.

The host (playing apparatus) on which the medium (memory card) is mounted inputs selection information of a content to be played in step S511. For example, the host (playing apparatus) displays a list of contents stored in the memory card on the display of the host, and the user selects a content to be played from the displayed content list, and accordingly, the data processing section of the host identifies the user's specified selected content.

In step S512, the host activates a playing program according to the type of the selected content.

With the present processing example, the type of the content is one of the following (a) and (b).
(a) Normal content, and
(b) High value-added content Specifically, the host holds a normal content playing program for executing playback processing of a normal content, and a high value-added content playing program for executing playback processing of a high value-added content, and activates the playing program corresponding to the type of the content selected as an object to be played.

Note that, though the host may have the normal content playing program alone, such a host fails to execute playback processing of a high value-added content. Also, the high value-added content playing program may be set so as to play only high value-added contents, or may be set to be a program capable of playing both of high value-added contents and normal contents.

Next, in step S513, the host obtains a device certificate (Host Cert) correlated with the playing program activated according to the type of the content from the memory of the device itself. This device certificate (Host Cert) is a host certificate (Host Cert) previously described with reference to FIG. 7, and is a certificate in which the following information is recorded as type information.
(1a) Device type information
(1b) Corresponding content type information Note that, for example, the normal content playing program may obtain a host certificate alone corresponding to a normal content, indicated in (B) in FIG. 7, and the high value-added content playing program may obtain a host certificate alone corresponding to a high value-added content and a normal content, indicated in (A) in FIG. 7. For example, with information for obtaining a host certificate recorded in each playing program (e.g., memory address), only information (address) corresponding to the host certificate of any one of (A) and (B) in FIG. 7 is recorded, each playing program may obtain an only host certificate that can be used by the program itself.

Next, in steps S514a and S514b, mutual authentication processing between the host (playing apparatus) and the medium (memory card) is executed. With this mutual authentication processing, the host (playing apparatus) transmits the host certificate (Host Cert) obtained from the memory of the host to the medium (memory card).

On the other hand, the medium (memory card) transmits a device certificate for media (Media Cert) stored in the memory within the medium (memory card) to the host (playing apparatus). This authentication processing is executed as mutual authentication processing of the public key cryptosystem to which these both of the public key certificates have been applied, for example.

Next, processing in steps S515a and S515b and thereafter illustrated in FIG. 20 will be described.

In steps S515a and S515b, determination is made regarding whether or not the mutual authentication between the host (playing apparatus) and the medium (memory card) has been established. In the case that the mutual authentication has not been established, determination is made that reliability between both devices has failed to be confirmed, the flow proceeds to step S530, and the content playback processing is stopped.

In the case that the mutual authentication has been established, in step S516 the medium (memory card) discriminates the type of the host (playing apparatus) based on the device type information included in the type information of the device certificate (Hose Cert). For example, the medium (memory card) discriminates the device type such that the host is a device only for recording/playing, a PC, or a portable terminal such as a tablet terminal or the like.

Next, in step S517, the medium (memory card) executes encoding processing of the medium ID (MID) in accordance with the encoding (Encode) algorithm that has been set correlated with the device type beforehand according to the type (e.g., device only for recording/playing, PC, or portable terminal) of the host (playing apparatus) discriminated based on the device certificate (Host Cert).

The medium (memory card) is configured so as to selectively execute multiple encoding algorithms, and executes encoding (Encode) of the medium ID (MID) by selecting one from these multiple encoding algorithms according to the type of the host (playing apparatus).

Next, in step S518a, the medium (memory card) transmits the encoded medium ID (MID) to the host (playing apparatus).

In step S518b, the host (playing apparatus) receives the encoded medium ID (MID) from the medium (memory card).

Next, in step S519 illustrated in FIG. 21, the host (playing apparatus) applies the decoding algorithm only for a device which the device itself can execute to execute decoding (decode) of the encoded medium ID (MID).

In the case that determination is made in step S520 as decoding failure, the flow proceeds to step S530, and the content playback processing is stopped.

In the case that determination is made in step S520 as decoding success, and obtaining of the medium ID (MID) has succeeded, the flow proceeds to step S521.

In step S521a, the medium (memory card) executes processing for providing data used for content playback. Specifically, examples of this data include a title key stored in the protected area, and an encrypted content stored in the general purpose area.

In step S521b, the host (playing apparatus) receives a title key, an encrypted content, and so forth from the medium (memory card).

Finally, the host (playing apparatus) executes the decryption processing of an encrypted content using the title key received from the medium (memory card) to perform content playback.

Note that, though the processes in steps S518*a* through S522 is illustrated in a simplified manner in the present flow, these processes correspond to the processes previously described with reference to FIG. 18, wherein processes such as MAC verification processing of the medium ID, obtaining of a title key by calculation of a converted title key based on the usage control information, and so forth are executed.

In this way, the medium (memory card) executes content playback by changing the conversion mode of the medium ID (MID) according to the host (playing apparatus) that executes content playback. According to this processing, only in the case that matching between the type of the host (playing apparatus) and the type information of the host certificate that the host (playing apparatus) presents has been confirmed, content playback may be performed.

Also, the medium (memory card) may confirm the type of the host (playing apparatus) based on the host certificate (Host Cert), and may also execute content usage control according to the host (playing apparatus). For example, an arrangement may be made wherein content usage control according to the type of the host (playing apparatus) can be executed such that usage of a particular content is allowed at a device only for recording/playing alone, but not allowed at a PC and portable terminal.

Note that, with the flowcharts in FIGS. 19 through 21, in the same way as described with reference to FIGS. 9 through 11, though an arrangement is made wherein in step S512 the playing program according to the type of the selected content is activated, and the host certificate (Host Cert) correlated with the playing program is selected (S513), an arrangement may be made wherein as with the flow described with reference to FIGS. 12 through 14, the content playing program itself selects a host certificate according the content type.

Also, the above multiple embodiments, i.e.: (first embodiment) a process for selectively activating a playing program according to content type, and using a host certificate (Host Cert) correlated with the activated playing program, (second embodiment) a process for a playing program selectively uses a host certificate (Host Cert) according to content type, and (third embodiment) a process for changing the conversion mode of the medium ID (MID) according to the type of the host (playing apparatus), these processes may be arranged to be executed independently, or may be arranged to be executed as a combination between the first embodiment and the third embodiment, or a combination between the second embodiment and the third embodiment.

6. Hardware Configuration Example of Each Device

Finally, hardware configuration examples of the devices for executing the above processes will be described with reference to FIGS. 22 and 23.

First, a hardware configuration example of a host device on which a memory card is mounted for performing data recording/playback processing will be described with reference to FIG. 22.

A CPU (Central Processing Unit) 701 serves as a data processing section for executing various types of processing in accordance with a program stored in ROM (Read Only Memory) 702 or a storage unit 708. For example, the CPU 701 executes content reception processing from a broadcasting station or server, recording processing of received data as to a memory card (removable medium 711 in the drawing), data playback processing from the memory card (removable medium 711 in the drawing), and so forth. A program that the CPU 701 executes, data, or the like is stored in RAM (Random Access Memory) 703 as appropriate. These CPU 701, ROM 702, and RAM 703 are mutually connected by a bus 704.

The CPU 701 is connected to an input/output interface 705 via the bus 704, and an input unit 706 made up of various types of switches, keyboard, mouse, microphone, and so forth, and an output unit 707 made up of a display, speakers, and so forth are connected to the input/output interface 705. The CPU 701 executes various types of processing corresponding to a command input from the input unit 706, and outputs the processing result to, for example, the output unit 707.

The storage unit 708 connected to the input/output interface 705 is made up of, for example, a hard disk or the like, and stores a program that the CPU 701 executes, and various types of data. A communication unit 709 communicates with an external device via a network such as the Internet or local area network, or the like.

A drive 710 connected to the input/output interface 705 drives a removable medium 711 such as a magnetic disk, optical disc, magneto-optical disk, or semiconductor memory such as a memory card or the like to obtain various types of data such as recorded content, key information, and so forth. For example, content decryption/playback processing or the like is performed using the obtained content and key data in accordance with the playing program that the CPU executes.

FIG. 23 illustrates a hardware configuration example of a memory card. A CPU (Central Processing Unit) 801 serves as a data processing section for executing various types of processing in accordance with a program stored in ROM (Read Only Memory) 802 or a storage unit 807. For example, the CPU 801 executes communication processing between with a server or host device, processing of writing or reading or the like of data as to the storage unit 807, accessible/inaccessible determination processing in increments of section areas of the protected area 811 of the storage unit 807, which have been described with the above embodiments, and so forth. A program that the CPU 801 executes, data, and so forth are stored in RAM (Random Access Memory) 803 as appropriate. These CPU 801, ROM 802, and RAM 803 are mutually connected by a bus 804.

The CPU 801 is connected to an input/output interface 805 via the bus 804, and a communication unit 806, and the storage unit 807 are connected to the input/output interface 805.

The communication unit 804 connected to the input/output interface 805 executes communication with a server or host, for example. The storage unit 807 is a data storage area, and includes a protected area (Protected Area) 811 having access privileges, a general purpose area (General Purpose Area) 812 where data recording/reading can freely be performed, as previously described above.

Figure 22:
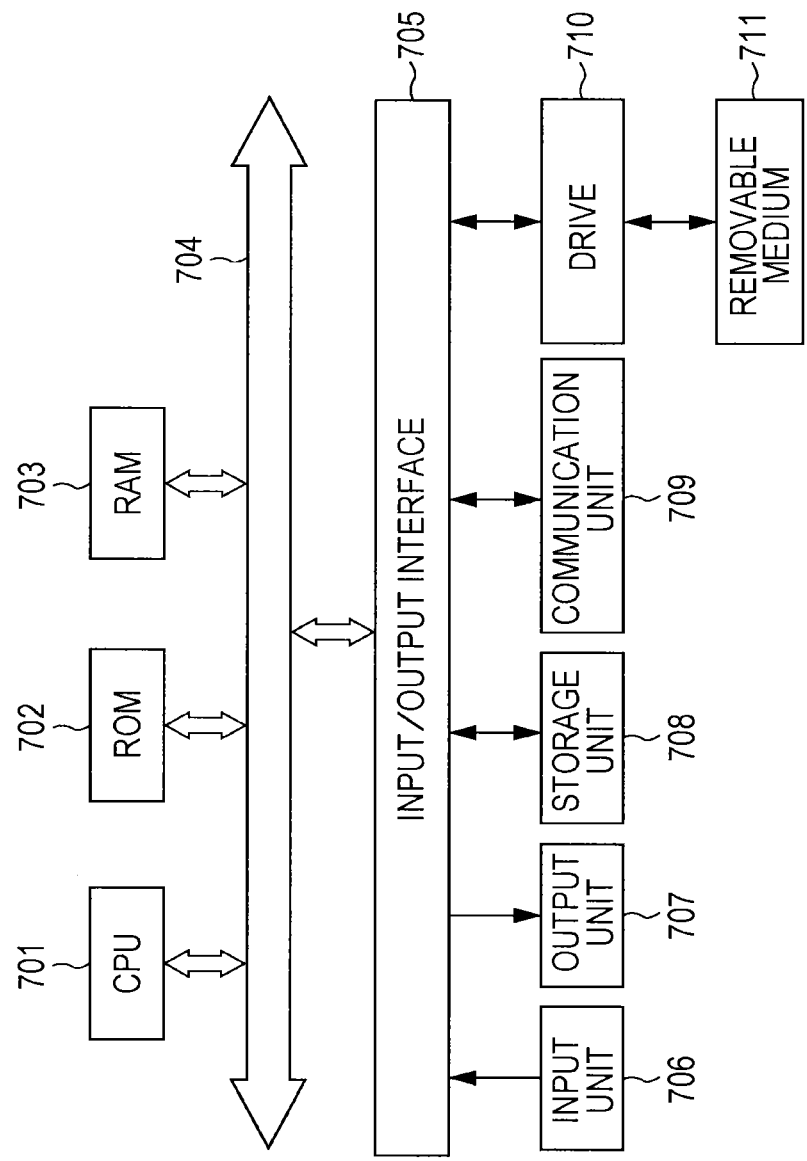
FIG. 22 is a diagram for describing a hardware configuration example of a host (playing apparatus)

Note that the server may be realized with a device having the same hardware configuration as with the host device illustrated in FIG. 22, for example.

7. Overview of Configuration of Present Disclosure

Embodiments of the present disclosure have been described in detail with reference to particular embodiments. However, it is clearly evident that one skilled in the art can conceive various modifications or alternations without departing from the essence of the present disclosure. That is to say, the present disclosure has been described in an exemplification mode, which is not to be interpreted in a limited manner. The claims should be referred to in order to determine the essence of the present disclosure.

Note that the technology disclosed in the present Specification may have the following arrangements.

(1) An information processing system including:

a medium in which a content serving as an object to be played is stored; and a playing apparatus configured to play a content stored in the medium;

wherein the playing apparatus is configured to selectively activate a playing program according to a content type selected as an object to be played, to obtain a device certificate correlated with the playing program from a storage unit by execution of the selectively activated playing program, and to transmit the obtained device certificate to the medium;

and wherein the device certificate is a device certificate for content types in which content type information that can take advantage of the device certificate is recorded;

and wherein the medium determines whether or not an encryption key of which a reading request has been performed from the playing apparatus is an encryption key for decrypting an encrypted content matching an available content type recorded in the device certificate, and permits readout of the encryption key only in the case of matching.

(2) The information processing system according to (1), wherein the device certificate has a structure where at least one of a high value-added content and a normal content other than the high value-added content is recorded as a content type that can take advantage of the device certificate;

and wherein the medium determines whether or not an encryption key of which reading from the playing apparatus has been requested is an encryption key for decrypting an encrypted content matching a high value-added content or normal content which is an available content type recorded in the device certificate, and permits readout of the encryption key only in the case of matching.

(3) The information processing system according to (1) or (2), wherein the playing apparatus transmits an obtained device certificate to execute authentication processing;

and wherein the medium executes permission determination processing of an encryption key readout request from the playing apparatus with establishment of the authentication processing as a condition.

(4) The information processing system according to any of (1) through (3), wherein the playing apparatus selectively activates a playing program by identifying the type of a selected content in accordance with attribute information correlated with a content selected as an object to be played.

(5) The information processing system according to any of (1) through (4), wherein the medium stores an encryption key in a protected area where access is permitted based on confirmation of access privileges of a playing apparatus, and confirms access privileges of the protected area where the encryption key is stored, based on protected area access privileges information recorded in a device certificate to be received from the playing apparatus, and permits readout of an encryption key by the playing apparatus in the case of the access privileges of the playing apparatus being confirmed.

(6) The information processing system according to any of (1) through (5), wherein the device certificate has a structure where playing apparatus type information that can take advantage of the device certificate is recorded;

and wherein the medium executes encoding processing of a medium ID that is identification information of the medium in accordance with an encoding algorithm to be selected according to playing apparatus type information recorded in the device certificate to transmit to the playing apparatus;

and wherein the playing apparatus performs decoding or playing of a content accompanying with data processing to which a medium ID obtained by decoding an encoded medium ID received from the medium in accordance with a decoding algorithm corresponding to the device type of the apparatus itself has been applied.

(7) An information processing device including:

a data processing unit configured to execute readout and playback processing of a content stored in a medium;

wherein the data processing unit is configured to selectively activate a playing program according to a content type selected as an object to be played, to obtain a device certificate correlated with this playing program from a storage unit by execution of the selectively activated playing program to transmit the obtained device certificate to the medium, and also to output an encrypted content, and a readout request of an encryption key to be applied to decryption of this encrypted content to the medium, and to obtain an encryption key from the medium with confirmation being made with the medium as a condition wherein an encryption key of which the readout request has been performed is an encryption key of a content matching a content type that can be used recorded in the device certificate to perform decryption of an encrypted content by applying the obtained encryption key thereto.

(8) The information processing device according to (7), wherein the device certificate has a structure where at least one of a high value-added content and a normal content other than the high value-added content is recorded as a content type that can take advantage of the device certificate.

(9) The information processing device according to (7) or (8), wherein the data processing unit transmits an obtained device certificate to the medium to execute authentication processing.

(10) The information processing device according to any of (7) through (9), wherein the data processing unit selectively activates a playing program by identifying the type of a selected content in accordance with attribute information correlated with a content selected as an object to be played.

(11) The information processing device according to any of (7) through (10), wherein the device certificate has a structure where playing apparatus type information that can take advantage of the device certificate is recorded;

and wherein the medium executes encoding processing of a medium ID that is identification information of the medium in accordance with an encoding algorithm to be selected according to playing apparatus type information recorded in the device certificate to transmit to the information processing device;

and wherein a data processing unit of the information processing device performs decoding or playing of a content accompanying with data processing to which a medium ID obtained by decoding an encoded medium ID received from the medium in accordance with a decoding algorithm corresponding to the device type of the apparatus itself has been applied.

(12) An information processing device including:

a storage unit in which an encrypted content serving as an object to be played in a playing apparatus, and an encryption key to be applied to decryption of the encrypted content are stored; and a data processing unit;

wherein the data processing unit is configured to receive a device certificate from the playing apparatus, and also to receive a readout request of an encryption key to be applied to decryption of an encrypted content serving as an object to be played, and to determine whether or not an encryption key of which a reading request has been performed from the playing apparatus is an encryption key for decrypting an encrypted content matching an available content type recorded in the device certificate, and to permit readout of the encryption key only in the case of matching.

(13) The information processing device according to (12), wherein the device certificate has a structure where at least one of a high value-added content and a normal content other than the high value-added content is recorded as a content type that can take advantage of the device certificate;

and wherein the data processing unit determines whether or not an encryption key of which a reading request has been performed from the playing apparatus is an encryption key for decrypting an encrypted content matching a high value-added content or normal content which has an available content type recorded in the device certificate, and permits readout of the encryption key only in the case of matching.

(14) The information processing device according to (12) or (13), wherein the encryption key is stored in a protected area within a storage unit where access is permitted based on confirmation of access privileges of a playing apparatus;

and wherein the data processing unit confirms access privileges of the protected area where the encryption key is stored, based on protected area access privileges information recorded in a device certificate to be received from the playing apparatus, and permits readout of an encryption key by the playing apparatus in the case of the access privileges of the playing apparatus being confirmed.

(15) The information processing device according to any of (12) through (14), wherein the device certificate has a structure where playing apparatus type information that can take advantage of the device certificate is recorded;

and wherein the data processing unit executes encoding processing of a medium ID that is identification information of the medium in accordance with an encoding algorithm to be selected according to playing apparatus type information recorded in the device certificate to transmit to the playing apparatus.

Further, a processing method to be executed at the above device and system, and a program causing the device and system to execute processing are also encompassed in the arrangement of the present disclosure.

Also, a series of processing described in the Specification may be executed by hardware or software or a complex arrangement of both. In the case of executing processing according to software, a program in which a processing sequence is recorded may be executed by being installed in memory within a computer embedded in dedicated hardware, or may be executed by being installed in a general-purpose computer capable of various types of processing. For example, the program may be recorded in a recording medium beforehand. In addition to the program being installed in a computer from a recording medium, the program may be received via a network such as a LAN (Local Area Network) or the Internet and installed in a recording medium such as a built-in hard disk or the like.

Note that the various types of processing according to the present Specification include not only processing performed in time sequence in accordance with the described sequence but also processing not necessarily performed in time sequence but performed in parallel or individually according to the processing capabilities or demands of a device which executes the processing. Also, with the present Specification, the term "system" is a logical group configuration of multiple devices, and is not restricted to a configuration wherein devices serving as the components are not included in the same casing.

The present disclosure contains subject matter related to that disclosed in Japanese Priority Patent Application JP 2011-175606 filed in the Japan Patent Office on Aug. 11, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
a flash memory in which content to be played is stored; and
a playing apparatus comprising one or more processors that:
plays said content stored in said flash memory,
selectively activates a playing program according to a content type of said content selected to be played;
obtains a device certificate associated with said selectively activated playing program from a storage unit by execution of said selectively activated playing program; and
transmits said obtained device certificate to said flash memory, wherein said device certificate comprises content type information of said content recorded therein, and
wherein said flash memory determines whether an encryption key requested from said playing apparatus decrypts an encrypted content that matches said content type information recorded in said device certificate, and permits readout of said encryption key based on said matching, and
wherein said flash memory determines whether to permit access to each of a plurality of sections in a protected area of said flash memory based on protected area access privileges information recorded in said device certificate.

2. The information processing system according to claim 1, wherein said content type information recorded in said device certificate corresponds to at least one of a first content accessible through access privileges and a second content accessible without said access privileges, and
wherein said flash memory determines whether an encryption key decrypts an encrypted content matching one of said first content or said second content which is an available content type recorded in said device certificate, and permits readout of said encryption key based on said matching.

3. The information processing system according to claim 1, wherein said playing apparatus transmits said obtained device certificate to execute authentication processing, and
wherein said flash memory executes permission determination processing of an encryption key readout request from said playing apparatus when said authentication processing is executed.

4. The information processing system according to claim 1, wherein said playing apparatus selectively activates said playing program by identifying said content type of said selected content in accordance with attribute information associated with said selected content.

5. The information processing system according to claim 1, wherein said flash memory stores said encryption key in said protected area where access is permitted based on confirmation of access privileges of said playing apparatus, and confirms said access privileges of said protected area where said encryption key is stored, based on said protected area access privileges information recorded in said device certificate to be received from said playing apparatus, and permits readout of said encryption key by said playing apparatus when said access privileges of said playing apparatus are confirmed.

6. The information processing system according to claim 1,
wherein said device certificate has a structure where playing apparatus type information is recorded,
wherein said flash memory executes encoding processing of a medium ID that identifies said flash memory in accordance with an encoding algorithm to be selected according to said playing apparatus type information recorded in said device certificate to transmit to said playing apparatus, and
wherein said playing apparatus performs decoding or playing of said content involving data processing to which said medium ID is applied, said medium ID obtained by decoding an encoded medium ID received from said flash memory in accordance with a decoding algorithm corresponding to a device type of said playing apparatus.

7. An information processing device comprising:
a computer processor configured to:
execute readout and playback processing of content stored in a medium;
selectively activate a playing program according to a content type of said content selected to be played;
obtain a device certificate associated with said selectively activated playing program from a storage unit by execution of said selectively activated playing program;
transmit said obtained device certificate to said medium;
output an encrypted content and a readout request of an encryption key to be applied to decryption of said encrypted content to said medium; and
obtain said encryption key from said medium, wherein said encryption key for which a readout request has been performed decrypts content that matches content type information recorded in said device certificate,
wherein access privileges of a playing apparatus to access each section of a protected area of said medium is confirmed based on protected area access privileges information recorded in said device certificate.

8. The information processing device according to claim 7, wherein said content type information recorded in said device certificate corresponds to at least one of a first content accessible through access privileges and a second content accessible without said access privileges.

9. The information processing device according to claim 7, wherein said computer processor transmits said obtained device certificate to said medium to execute authentication processing.

10. The information processing device according to claim 7, wherein said computer processor selectively activates said playing program by identifying said content type of said selected content in accordance with attribute information associated with said content selected to be played.

11. The information processing device according to claim 7,
wherein said device certificate has a structure where playing apparatus type information is recorded,
wherein said medium executes encoding processing of a medium ID that identifies said medium in accordance with an encoding algorithm to be selected according to said playing apparatus type information recorded in said device certificate to transmit to said information processing device, and
wherein said computer processor of said information processing device performs decoding or playing of said content involving data processing to which said medium ID is applied, said medium ID obtained by decoding an encoded medium ID received from said medium in accordance with a decoding algorithm corresponding to a device type of said playing apparatus.

12. An information processing device comprising:
a storage unit in which an encrypted content to be played in a playing apparatus and an encryption key to be applied to decrypt said encrypted content are stored; and
one or more processors that:
receives a device certificate from said playing apparatus, wherein said device certificate is associated with a selected playing program;
receives a readout request of said encryption key to be applied to decryption of said encrypted content to be played; and
determines whether said encryption key requested from said playing apparatus decrypts said encrypted content that matches a content type recorded in said device certificate, and permit readout of said encryption key based on said matching,
wherein access privileges of said playing apparatus to access each of a plurality of sections in a protected area of said storage unit is confirmed based on protected area access privileges information recorded in said device certificate.

13. The information processing device according to claim 12, wherein said content type recorded in said device certificate corresponds to at least one of a first content accessible through access privileges or a second content accessible without said access privileges; and
wherein said one or more processors are operable to determine whether said encryption key decrypts said encrypted content matching one of said first content or said second content which has an available content type recorded in said device certificate, and permits readout of said encryption key based on said matching.

14. The information processing device according to claim 12,
wherein said encryption key is stored in said protected area within said storage unit where access is permitted based on confirmation of said access privileges of said playing apparatus; and
wherein said one or more processors are operable to confirm said access privileges of said protected area where said encryption key is stored, based on said protected area access privileges information recorded in said device certificate to be received from said playing apparatus, and permit readout of said encryption key by said playing apparatus when said access privileges of said playing apparatus are confirmed.

15. The information processing device according to claim 12,
wherein said device certificate has a structure where playing apparatus type information is recorded, and
wherein said one or more processors are operable to execute encoding processing of a medium ID that identifies said medium in accordance with an encoding algorithm to be selected according to said playing apparatus type information recorded in said device certificate to transmit to said playing apparatus.

16. An information processing method comprising:
in an information processing system comprising a flash memory in which content to be played is stored, and a playing apparatus configured to play said content stored in said flash memory:
selectively activating a playing program according to a content type of said content selected to be played; and
obtaining a device certificate associated with said selectively activated playing program from a storage unit by execution of said selectively activated playing program to transmit said obtained device certificate to said flash memory,
wherein said device certificate comprises content type information of said content recorded therein,
wherein said flash memory determines whether an encryption key requested from said playing apparatus decrypts an encrypted content that matches said content type information recorded in said device certificate, and permits readout of said encryption key based on said matching, and
wherein an access to each of a plurality of sections in a protected area of said flash memory is permitted based on protected area access privileges information recorded in said device certificate.

17. An information processing method comprising:
in an information processing device:
selectively activating a playing program according to a content type of said content selected to be played;
obtaining a device certificate associated with said selectively activated playing program from a storage unit by execution of said selectively activated playing program to transmit said obtained device certificate to a medium;
outputting an encrypted content and a readout request of an encryption key to be applied to decryption of said encrypted content to said medium; and
obtaining said encryption key from said medium, wherein said encryption key for which a readout request has been performed decrypts said encrypted content that matches content type information recorded in said device certificate,
wherein access privileges of a playing apparatus to access each section area of a protected area of said medium is confirmed based on protected area access privileges information recorded in said device certificate.

18. An information processing method to be executed in an information processing device, said information processing method comprising:
storing an encrypted content to be played in a playing apparatus and an encryption key to be applied to decrypt said encrypted content in a storage unit;
receiving a device certificate from said playing apparatus, wherein said device certificate is associated with a selected playing program;
receiving a readout request of said encryption key to be applied to decryption of said encrypted content to be played; and
determining whether said encryption key requested from said playing apparatus decrypts said encrypted content that matches a content type recorded in said device certificate, and permitting readout of said encryption key based on said matching,
wherein access privileges of said playing apparatus to access each of a plurality of sections in a protected area of said storage unit is confirmed based on protected area access privileges information recorded in said device certificate.

19. A non-transitory computer-readable storage medium having stored thereon, a computer executable instructions for causing a computer to perform steps comprising:
selectively activating a playing program according to a content type of content selected to be played;
obtaining a device certificate associated with said selectively activated playing program from a storage unit by execution of said selectively activated playing program to transmit said obtained device certificate to a medium;
outputting an encrypted content and a readout request of an encryption key to be applied to decryption of said encrypted content to said medium; and
obtaining said encryption key from said medium, wherein said encryption key for which a readout request has been performed decrypts said encrypted content that matches content type information recorded in said device certificate,
wherein access privileges of a playing apparatus to access each section of a protected area of said medium is confirmed based on protected area access privileges information recorded in said device certificate.

20. A non-transitory computer-readable storage medium having stored thereon, a computer executable instructions for causing a computer to perform steps comprising:
storing an encrypted content to be played in a playing apparatus and an encryption key to be applied to decrypt said encrypted content in a storage unit;
receiving a device certificate from said playing apparatus, wherein said device certificate is associated with a selected playing program;
receiving a readout request of said encryption key to be applied to decryption of said encrypted content to be played; and
determining whether said encryption key requested from said playing apparatus decrypts said encrypted content that matches a content type recorded in said device certificate, and permitting readout of said encryption key based on said matching,
wherein access privileges of said playing apparatus to access each of a plurality of sections in a protected area of said storage unit is confirmed based on protected area access privileges information recorded in said device certificate.

* * * * *